(12) United States Patent
Tahara

(10) Patent No.: US 7,090,279 B2
(45) Date of Patent: *Aug. 15, 2006

(54) BICYCLE WITH COVER

(75) Inventor: Yoshimasa Tahara, Shimoniikawa-gun (JP)

(73) Assignee: Shirouma Saiensu Kabushiki Kaisha, Toyama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/492,225

(22) PCT Filed: Jul. 15, 2002

(86) PCT No.: PCT/JP02/07154

§ 371 (c)(1),
(2), (4) Date: Apr. 8, 2004

(87) PCT Pub. No.: WO03/062037

PCT Pub. Date: Jul. 31, 2003

(65) Prior Publication Data

US 2004/0251715 A1 Dec. 16, 2004

(30) Foreign Application Priority Data

| Jan. 22, 2002 | (JP) | 2002-012770 |
| Mar. 5, 2002 | (JP) | 2002-058113 |
| Apr. 3, 2002 | (JP) | 2002-101090 |
| Apr. 23, 2002 | (JP) | 2002-120060 |
| May 21, 2002 | (JP) | 2002-145748 |

(51) Int. Cl.
  *B62J 17/00* (2006.01)
(52) U.S. Cl. .................... 296/78.1; 296/77.1
(58) Field of Classification Search ............. 296/78.1, 296/136.01, 77.1, 155; 49/501, 360; 150/166, 150/167; 135/87, 88.01, 88.03
See application file for complete search history.

(56) References Cited

U.S. PATENT DOCUMENTS

| D245,903 S | * | 9/1977 | Harris, Jr. .............. D12/402 |
| 4,313,517 A | * | 2/1982 | Pivar .................... 180/216 |
| 4,973,082 A | * | 11/1990 | Kincheloe ............... 280/756 |
| 5,458,390 A | * | 10/1995 | Gilbert ................. 296/78.1 |
| 5,662,372 A | * | 9/1997 | Lubkeman ............. 296/136.04 |
| 5,685,388 A | * | 11/1997 | Bothwell et al. ........ 180/219 |
| 5,791,718 A | * | 8/1998 | Boutin ................. 296/78.1 |
| 6,017,076 A | * | 1/2000 | Belisle ................ 296/78.1 |
| 6,402,220 B1 | * | 6/2002 | Allen .................. 296/77.1 |
| 2003/0218358 A1 | * | 11/2003 | Hahn ................... 296/155 |

FOREIGN PATENT DOCUMENTS

| DE | 906413 | * | 3/1954 | .............. 296/78.1 |
| IT | 529623 | * | 5/1955 | .............. 296/78.1 |
| IT | 560043 | * | 10/1956 | .............. 296/78.1 |
| JP | 30-13728 | | 9/1955 | |

(Continued)

*Primary Examiner*—Kiran B. Patel
(74) *Attorney, Agent, or Firm*—Jordan and Hamburg LLP

(57) ABSTRACT

The present invention provides a man-driven vehicle equipped with a cover structure practically covering a whole of the vehicle wherein the cover structure is provided with an openable and closable door way substantially comprising a door, a detachable cover, a rotatable cover, and a slide cover cooperating one with another so as to facilitate a driver to get on or off the vehicle. The cover structure additionally comprises a ground contacting skirt and a floor panel so that the vehicle can be comfortably driven even in adverse weather with the cover structure closed and, particularly in fine weather, the vehicle also can be driven with the cover structure opened.

29 Claims, 36 Drawing Sheets

FOREIGN PATENT DOCUMENTS

| | | |
|---|---|---|
| JP | 32-11136 | 9/1957 |
| JP | 49-119952 | 10/1974 |
| JP | 50-41243 | 4/1975 |
| JP | 54-26253 | 2/1979 |
| JP | 59-199383 | 11/1984 |
| JP | 60-15069 | 2/1985 |
| JP | 60-90083 | 6/1985 |
| JP | 2-145984 | 9/1985 |
| JP | 61-155279 | 9/1986 |
| JP | 62-54890 | 4/1987 |
| JP | 60-77194 | 6/1990 |
| JP | 4-283185 | 10/1992 |
| JP | 10-258783 | 9/1998 |
| JP | 11-059552 | 3/1999 |

\* cited by examiner

BICYCLE WITH COVER

DETAILED DESCRIPTION OF THE INVENTION

1. Field of the Invention

The present invention relates to a man-driven vehicle equipped with a capsule-like cover structure.

BACKGROUND OF THE INVENTION

2. Related Art

The man-driven vehicle equipped with a hood for weather protection means is well known, for example, from Japanese Laid-Open Patent Application Gazette No. 1999-59552 disclosing a man-driven vehicle having a hood extending merely above a driver or from Japanese Laid-Open Patent Application Gazette No. 1975-41243 disclosing a man-driven vehicle having a hood detachably provided so as to extend merely above a driver.

It is also well known to provide the vehicle's wheels with splash board means.

PROBLEM TO BE SOLVED BY THE INVENTION

None of the man-driven vehicle having a cover structure adapted for entirely covering the vehicle has been proposed. With the conventional hood extending merely above the driver, it is impossible to protect the driver against side blow of rain and wind because the driver is laterally unguarded.

Even with the cover structure adapted to guard the driver against side flow of rain and wind, it is impossible to protect the driver against muddy water, dust, insects, rain, snow, chill, hot air or the like because such cover structure of prior art is opened downward.

It is often impossible for the mudguard alone to protect the driver from mud and water splashed from rain puddle or the like and if wind and rain are relatively fierce, the driver's feet are often wet with rain and wind blowing up from beneath.

Furthermore, the cover structure adapted to cover the driver from above has another inconvenience that the driver must attach and detach such cover structure to the vehicle every time the driver gets on and off the vehicle.

SUMMARY OF THE INVENTION

In view of the problem as has been described above, it is a principal object of the invention to provide a man-driven vehicle equipped with a cover structure adapted to cover substantially whole of the vehicle which is, in turn, provided with a selectively openable and closable door way through which a driver can get on and off the vehicle, as described in a first aspect of the invention.

With this arrangement, the cover structure adapted to cover substantially whole of the vehicle allows the vehicle to run even under adverse environmental condition such as rainfall, cold gale, sandblast or the other adverse weather and environment. In fine weather, the openable and closable door way of the cover structure may be operated to enjoy comfortable landscape and to respire outer fresh air. Not only in doors but also out of doors, it is possible to work pedals on the vehicle in a stationary state for the purpose of health maintenance or battery charging with the cover structure being opened. In addition, the driver can easily get on or off the vehicle through the opennable and closable door way.

The present invention provides also the man-driven vehicle equipped with the cover structure wherein the cover structure substantially covering whole of the vehicle is fixed to a vehicle frame and the cover structure is provided with the a door for getting on and off, as described in a second aspect of the invention.

With this arrangement, the cover structure covering substantially whole of the vehicle is fixed to the vehicle frame to protect the driver from wind, rainfall, UV(sunlight) or the like and the cover structure is provided with the door to facilitate the driver to get on and off the vehicle.

The present invention provides also the man-driven vehicle equipped with the cover structure according to a second aspect of the invention wherein said door is provided on one side or each side of said cover structure, as described in a third aspect of the invention.

In this way, the door provided on one or both sides of the cover structure facilitates the driver to get on and off the vehicle.

The present invention provides also the man-driven vehicle equipped with the cover structure according to a second or third aspect of the invention wherein said door is adapted to be opened and closed in slide mode, as described in a fourth aspect of the invention.

With this arrangement, the door slides along the cover structure so that the door can be opened or closed even in a restricted space without projecting sideways and a correspondingly large door way can be ensured.

The present invention provides also the man-driven vehicle equipped with the cover structure according to a second or third aspect of the invention wherein said door is adapted to be opened and closed in hinge mode.

With this arrangement, the door can be opened or closed by means of a relatively simple hinge mechanism.

The present invention provides also the man-driven vehicle equipped with the cover structure according to any one of a second through fifth aspects of the invention wherein said door is a combination of a door section adapted to be opened in slide mode and a door section adapted to be closed in hinge mode, as described in a sixth aspect of the invention.

Such combination of the door section of slide mode and the door section of hinge mode is effective to reduce a slide range of the door, to enlarge the door way and to enable the door of hinge mode to be opened or closed even in a restricted space.

The present invention provides also the man-driven vehicle equipped with the cover structure according to a sixth aspect of the invention wherein the door section adapted to be opened and closed in hinge mode is connected to the door section adapted to be opened and closed in slide mode by means of hinge members, as described in a seventh aspect of the invention.

With this arrangement, the door of hinge mode may be opened after the door of slide mode has been moved to the end of the door way to complete opening of the door. In other words, the door as a whole can be opened completely with a lateral extension of the hinge mode door only by a width thereof.

The present invention provides also the man-driven vehicle equipped with the cover structure according to a seventh aspect of the invention wherein said door section adapted to be opened and closed in slide mode is connected to guide roller members of the cover structure by means of hinge members so that the door may be retracted within the cover structure, as described in an eighth aspect of the invention.

With this arrangement, the slide door hinge-connected to the slide member of the cover structure is pivoted around the hinge members as the door is closed, so the door is retracted within the cover structure and a width of the vehicle during its running may be correspondingly reduced.

The present invention provides also the man-driven vehicle equipped with the cover structure according to a sixth aspect of the invention wherein said door section adapted to be opened and closed in slide mode is connected to said door section adapted to opened and closed in hinge mode so that the door may be folded, as described in a ninth aspect of the invention.

With this arrangement, the door can be opened without inconvenience that the opened door might extend outward from the cover structure so far as the door is adapted to be folded inward.

The present invention provides also the man-driven vehicle equipped with the cover structure according to any one of a second through ninth aspects of the invention wherein said door is detachably provided, as described in a tenth aspect of the invention.

With this arrangement, the driver can get on or off the vehicle by detaching the door and, if desired, the vehicle can be driven with the door detached from the cover structure.

The present invention provides also the man-driven vehicle equipped with the cover structure according to a first aspect of the invention wherein the openable and closable door way comprises a detachable cover structure, as described in an eleventh aspect of the invention.

With this arrangement, the openable and closable door way can be defined by a detachable cover structure.

The present invention provides also the man-driven vehicle equipped with the cover structure according to an eleventh aspect of the invention wherein the detachable cover structure is entirely or partially detachable, as described in a twelfth aspect of the invention.

With this arrangement, the cover structure covering substantially whole of the vehicle can protect the driver from wind, rainfall, UV(sunlight) or the like and the cover structure can be detached as a whole or partially so as to facilitate the driver to get on and off the vehicle. In fine weather, the openable and closable door way of the cover structure may be detached to respire outer air as fresh as possible or to enjoy forest bathing. Not only in doors but also out of doors, it is possible to work pedals on the vehicle in a stationary state for the purpose of health maintenance or battery charging with the cover structure being opened.

The present invention provides also the man-driven vehicle equipped with the cover structure according to an eleventh aspect of the invention wherein a cover structure mounting frame is integrally provided on the vehicle itself and the detachable cover structure is detachably mounted on the cover structure mounting frame, as described in a thirteenth aspect of the invention.

With is arrangement, the detachable cover structure may be detached from the cover mounting frame integrally provided on the vehicle to simiplify a mechanism for detachably mounting the cover structure and to facilitate the detachably mounting operation. In addition to such convenience, the cover mounting frame serves to reinforce the vehicle body and serves also as a bumper after the detachable cover structure has been detached.

The present invention provides also the man-driven vehicle equipped with the cover structure according to a thirteenth aspect of the invention wherein the cover structure mounting frame is provided with rail members adapted to guide the detachable cover structure slidably in longitudinal direction of the vehicle as described in a fourteenth aspect of the invention.

With this arrangement, the detachable cover structure is slidably opened along the rail member and facilitates the driver to get on and off the vehicle.

The present invention provides also the man-driven vehicle equipped with the cover structure according to a fourteenth aspect of the invention wherein the detachable cover structure is detachable in the vicinity of ends of the respective rail members, as described in a fifteenth aspect of the invention.

With this arrangement, the detachable cover structure can be easily mounted or detached in the vicinity of the end of the rail member.

The present invention provides also the man-driven vehicle equipped with the cover structure according to a fourteenth or fifteenth aspect of the invention wherein the rail members mounted on the cover structure mounting frame are slidably provided with compromise rail members along which the detachable cover structure is slidable, as described in a sixteenth aspect of the invention.

With this arrangement, a length of the rail member can be reduced by a length of the compromise rail and a slide range of the detachable cover structure can be enlarged by the length of the compromise rail.

The present invention provides also the man-driven vehicle equipped with the cover structure according to any one of an eleventh through sixteenth aspects of the invention wherein the detachable cover structure is located on a rear half of the vehicle itself, as described in a seventeenth aspect of the invention.

With this arrangement, the front cover section ensures the vehicle to be driven without any problem even after the detachable cover structure has been detached.

The present invention provides also the man-driven vehicle equipped with the cover structure according to a first aspect of the invention wherein the openable and closable door way comprises the rotatable cover, as described in an eighteenth aspect of the invention.

With this arrangement, the openable and closable door way can be easily rotated as the rotatable cover adapted to be rotated and thereby to be opened.

The present invention provides also the man-driven vehicle equipped with the cover structure according to an eighteenth aspect of the invention wherein the cover structure covering substantially a whole of the vehicle includes a ceiling adapted to be opened and closed as the rotatable cover, as described in a nineteenth aspect of the invention.

With this arrangement, the cover structure adapted to cover substantially whole of the vehicle allows the vehicle to run even under adverse environmental condition such as rainfall, cold gale, sandblast or the other adverse weather and environment. In fine weather, the ceiling of the cover structure may be opened to enjoy comfortable landscape and to respire and touch outer fresh air. In doors, it is possible to work pedals on the vehicle in a stationary state for the purpose of health maintenance or battery charging with the ceiling being opened. The present invention provides also the man-driven vehicle equipped with the cover structure according to a nineteenth aspect of the invention wherein the cover structure is integrally mounted on the vehicle itself and the rotatable cover is rotatable relatively to the cover structure, as described in a twentieth aspect of the invention.

With this arrangement, the rotatable cover rotatably mounted on the stationary cover structure integral with the vehicle itself facilitates the rotatable cover to be made integrally with the stationary cover structure and thereby facilitates operation of assembly.

The present invention provides also the man-driven vehicle equipped with the cover structure according to a nineteenth or twentieth aspect of the invention, wherein the rotatable cover is rotatably mounted on a rear half of the vehicle itself, as described in a twenty-first aspect of the invention.

With this arrangement, the front cover section ensures the vehicle to run without any problem even after the rotatable cover has been opened.

The present invention provides also the man-driven vehicle equipped with the cover structure according to any one of a nineteenth through twenty-first aspects of the invention, wherein the rotatable cover is mounted on the cover structure so that the rotatable cover can slide in longitudinal direction of the vehicle, as described in a twenty-second aspect of the invention.

With this arrangement, the rotatable cover may be slidably moved rearward to adjust a size of opening on the side of the vehicle and thereby to facilitate the driver to get on or off the vehicle.

The present invention provides also the man-driven vehicle equipped with the cover structure according to a twenty-second aspect of the invention, wherein the rotatable cover is adapted to be positioning-stopped in the vicinity of the ends of the slide members, as described in a twenty-third aspect of the invention.

With this arrangement, the rotatable cover can be positioning-stopped in the vicinity of the end of the slide member whether the rotatable cover is held opened or closed.

The present invention provides also the man-driven vehicle equipped with the cover structure according to any one of an eighteenth through twenty-third aspects of the invention, wherein the rotatable cover is detachable, as described in a twenty-fourth aspect of the invention.

With this arrangement, in fine weather, the rotatable cover may be detached to enjoy outer landscape or to respire and touch fresh outer air. When the pedals are worked with the vehicle held stationary indoors for the purpose of health maintenance or battery charging, the rotatable cover can be detached.

The present invention provides also the man-driven vehicle equipped with the cover structure according to a first aspect of the invention, wherein the openable and closable door way comprises the rotatable cover integrally mounted on the slide cover structure, as described in a twenty-fifth aspect of the invention.

With this arrangement, depending on weather, ambient temperature and landscape or the other environmental condition, the rotatable cover may be adjustably opened or closed during running to regulate the environmental condition within the cover structure. In addition, the slide cover section may be moved not only to enlarge an opened area of the rotatable cover particularly for the pedal working for health maintenance or various repairing works but also to facilitate the driver to get one or off through the opened area of the rotatable cover.

The present invention provides the man-driven vehicle equipped with the cover structure according to a twenty-fifth aspect of the invention, wherein the slide cover structure is provided on the rear half of a stationary cover structure, as described in a twenty-sixth aspect of the invention.

With this arrangement, the slide cover section lying on the rear part of the stationary cover may be slidably moved to enable the rotatable cover as well as the slide cover section to be opened or closed without any problem in driving of the vehicle The present invention provides also the man-driven vehicle equipped with the cover structure according to a twenty-fifth or twenty-sixth aspect of the invention, wherein one of the slide cover structure and the stationary cover structure is provided with slide rails and the other is provided with guide rollers adapted to slide along these guide rails, as described in a twenty-seventh aspect of the invention.

With this arrangement, a simple construction comprising the slide rails cooperating with the guide rollers ensures a smooth sliding of the slide cover section relative to the stationary cover and it is also possible to stop the slide cover section at a desired position by providing the guide rollers with braking means.

The present invention provides also the man-driven vehicle equipped with the cover structure according to a twenty-seventh aspect of the invention, wherein the slide rails are provided on ends thereof with stoppers, as described in a twenty-eighth aspect of the invention.

With this arrangement, the slide cover section can be stopped at the slide terminating ends or at position along the way by said stopper means.

The present invention provides also the man-driven vehicle equipped with the cover structure according to any one of a twenty-fifth through a twenty-eighth aspects of the invention, wherein the slide cover structure is detachably mounted on the stationary cover structure, as described in a twenty-ninth aspect of the invention.

With this arrangement, after the slide cover section has been detached from the stationary cover, not only the vehicle can be uses without any problem but also the desired repairing operation can be carried out.

The present invention provides also the man-driven vehicle equipped with the cover structure according to any one of a twenty-seventh through a twenty-ninth aspects of the invention, wherein the slide rails are detachably mounted on the guide rollers and the slide cover structure is detachably mounted on the stationary cover structure, as described in a thirtieth aspect of the invention.

With this arrangement, the slide rails can be easily and reliably mounted on or detached from the guide rollers and thereby the slide cover section can be easily and reliably mounted on or detached from the stationary cover.

The present invention provides also the man-driven vehicle equipped with the cover structure according to any one of an eighteenth though a thirtieth aspects of the invention, wherein said rotatable cover comprises a plurality of rotatable cover sections, as described in a thirty-first aspect of the invention.

With this arrangement, a plurality of rotatable cover sections facilitate a rotation angle as well as an opened area of the rotatable cover to be adjusted and these sections may be overlapped one upon another to enlarge the opened area.

The present invention provides also the man-driven vehicle equipped with the cover structure according to a thirty-first aspect of the invention, wherein said rotatable cover comprises an upper rotatable cover section, an intermediate rotatable cover section overlapping said upper rotatable cover section, and a lower rotatable cover section overlapping said intermediate rotatable cover section, as described in a thirty-second aspect of the invention.

With this arrangement, the rotatable cover comprises upper, intermediate and lower sections adapted to be overlapped one upon another and to be fanned out.

The present invention provides also the man-driven vehicle equipped with the cover structure according to a thirty-first or thirty-second aspect of the invention, wherein said cover structure has a shaft by which said upper rotatable cover section, intermediate rotatable cover section and lower rotatable cover section are rotatably supported, as described in a thirty-third aspect of the invention.

With this arrangement, the rotatable cover can be adjustably rotated around the axis thereof.

The present invention provides also the man-driven vehicle equipped with the cover structure according to any one of a thirty-first through a thirty-third aspects of the invention, wherein said cover structure is provided on its rear part with a receiving space for said rotatable cover, as described in a thirty-fourth aspect of the invention.

With this arrangement, the rotatable cover can be stored into a relatively small space provided on the rear part of the stationary cover as the rotatable cover is opened.

The present invention provides also the man-driven vehicle equipped with the cover structure according to any one of a thirty-first through a thirty-fourth aspects of the invention, wherein said plurality of rotatable cover sections are operatively associated one with another by means of interlocking means, as described in a thirty-fifth aspect of the invention.

With this arrangement, a plurality of rotatable cover sections can controlled at a single position to be opened or closed by using interlocking means.

The present invention provides also the man-driven vehicle equipped with the cover structure according to a thirty-fifth aspect of the invention, wherein said interlocking means primarily comprise an interlocking projection extending from one end of said upper rotatable cover section as viewed in its opening and closing direction so as to be in contact with said intermediate rotatable cover section, an interlocking projection extending from one end of said intermediate rotatable cover section as viewed in its opening and closing direction so as to be in contact with said upper rotatable cover section, an interlocking projection extending from one end of said intermediate rotatable cover section as viewed in its opening and closing direction so as to be in contact with said said lower rotatable cover section and an interlocking projection extending from one end of said lower rotatable cover section as viewed in its opening and closing direction so as to be contact with said intermediate rotatable cover section, as described in a thirty-sixth aspect of the invention.

With this arrangement, the upper rotatable cover section may be held by the hand and fanned out to fan out successively the intermediate cover section and the lower rotatable cover section. Similarly, the upper rotatable cover section may be held by the hand and fan-folded to fanfold successively the intermediate cover section and the lower rotatable cover section.

The present invention provides also the man-driven vehicle equipped with the cover structure according to any one of a thirty-first through a thirty-sixth aspects of the invention, wherein said interlocking projections are provided with packing members, as described in a thirty-seventh aspect of the invention.

With this arrangement, the packing members provided on the respective interlocking projections improve sealing performance of respective joints, buffer collision among the interlocking projections occurring when the respective rotatable cover sections are interlocked one with another, and stop the rotatable cover sections at desired opened positions by a frictional resistance when the packing members between respective pairs of the adjacent rotatable cover sections.

The present invention provides also the man-driven vehicle equipped with the cover structure according to any one of a first though a thirty-seventh aspects of the invention, wherein the cover structure is provided along its bottom with a ground contacting skirt, as described in a thirty-eighth aspect of the invention.

With this arrangement, the cover structure practically covering a whole of the vehicle well protects the driver from adverse environmental conditions such as rain, wind and UV(sunlight) and the flexible ground contacting skirt provided along the bottom of the cover structure protects the driver from muddy water, sandblast, insects, rain, wind, snow, chill and warmth which otherwise would enter the cover structure from below the driver's feet. The ground contacting skirt is sufficient flexible to ensure the vehicle running without any problem even when the skirt contacts the ground.

The present invention provides also the man-driven vehicle equipped with the cover structure according to a thirty-eighth aspect of the invention, wherein said ground contacting skirt extends along the entire bottom of the cover structure, as described in a thirty-ninth aspect of the invention.

With this arrangement, the ground contacting skirt extends along the entire bottom of the cover structure and reliably protects the driver against muddy water, sandblast, insects, rain, wind, snow, chill and warmth which otherwise would attach the driver's feet from every direction.

The present invention provides the man-driven vehicle equipped with the cover structure according to a thirty-eighth or thirty-ninth aspect of the invention, wherein said ground contacting skirt has at least one split lying at its rear portion as viewed in the vehicle's running direction so that the skirt splits off as the skirt contacts any obstacle or the like, as described in a fortieth aspect of the invention.

With this arrangement, even when the ground contacting skirt comes in contact with any obstacle, the skirt splits off along its split lying at its rear portion as viewed in the vehicle's running direction so that the vehicle can pass such obstacle and avoid any accident such as upset due to sudden braking.

The present invention provides also the man-driven vehicle equipped with the cover structure according to a fortieth aspect of the invention, wherein said ground contacting skirt comprises a set of bottom sections adapted to split off one from another, as described in a forty-first aspect of the invention.

With this arrangement, even if the ground contacting skirt comes in contact with any obstacle during running, the set of bottom sections are adapted to split off one from another and sufficiently flexible to pass such obstacle and to ensure the vehicle to continue to run.

The present invention provides also the man-driven vehicle equipped with the cover structure according to a forty-first aspect of the invention, wherein another set of bottom sections are provided so as to cover the splits of the previously described set of bottom sections, as described in a forty-second aspect of the invention.

With this arrangement, said another set of bottom sections cover the splits of the adjacent set of bottom sections so as to protect the driver from muddy water, sandblast, insects, wind, rain, snow, chill and warmth which otherwise would attack the driver from below his or her feet.

The present invention provides also the man-driven vehicle equipped with the cover structure according to a forty-second aspect of the invention, wherein said two sets of bottom sections cooperate on with another to form the overlapping bottom sections, as described in a forty-third aspect of the invention.

With this arrangement, the adjacent two sets of bottom sections overlap one another and mutually cover the splits of these two sets of bottom sections.

The present invention provides also the man-driven vehicle equipped with the cover structure according to any one of a thirty-eighth through a forty-third aspects of the invention, wherein said ground contacting skirt is detachably mounted on the bottom of the cover structure, as described in a forty-fourth aspect of the invention.

With this arrangement, the ground contacting skirt can be detachably attached to the bottom of the cover structure.

The present invention provides also the man-driven vehicle equipped with the cover structure according to any one of a forty-first through a forty-third aspects of the invention, wherein said plurality of bottom sections are detachably mounted one by one on the bottom of the cover structure, as described in a forty-fifth aspect of the invention.

With this arrangement, the bottom sections can be detachably attached one by one to the bottom of the cover structure.

The present invention provides also the man-driven vehicle equipped with the cover structure according to any one of a thirty-eighth through a forty-fifth aspects of the invention, wherein said ground contacting skirt comprises elastically deformable member made of synthetic rubber or synthetic resin, as described in a forty-sixth aspect of the invention.

With this arrangement, the ground contacting skirt made of elastically deformable material such as synthetic rubber or synthetic resin is readily deformed even if the skirt comes in contact with any obstacle so as to pass such obstacle and can be detachably mounted on the cover structure without any loss of its elastic deformability.

The present invention provides also the man-driven vehicle equipped with the cover structure according to any one of a first through a forty-sixth aspects of the invention, wherein the vehicle body is provided with a floor panel, as described in a forty-seventh aspect of the invention.

With this arrangement, the floor panel mounted on the vehicle body effectively protect the driver against muddy water, wind and rain which otherwise would attack the driver from below his or her feet.

The present invention provides also the man-driven vehicle equipped with the cover structure and the floor panel according to a forty-seventh aspect of the invention, wherein the floor panel is provided with openings for feet setting on the ground, as described in a forty-eighth aspect of the invention.

With this arrangement, the driver can set his or her feet on the ground through the openings provided in the floor panel for this purpose and thereby controllably brake, support or move the vehicle without rising from the seat.

The present invention provides also the man-driven vehicle equipped with the cover structure and the floor panel according to a forty-eighth aspect of the invention, wherein the openings for feet setting on the ground are provided with an openable and closable floor panel section, as described in a forty-ninth aspect of the invention.

With this arrangement, the openings for feet setting on the ground can be covered or uncovered, if necessary, by operating the openable and closable floor panel section to block adverse weather or to control the vehicle with the driver's feet set on the ground.

The present invention provides also the man-driven vehicle equipped with the cover structure and the floor panel according to a forty-ninth aspect of the invention, wherein the openable and closable panel section comprise a slidable floor panel section, as described in a fiftieth aspect of the invention.

With this arrangement, the floor panel section may be slid to uncover the openings for feet setting on the ground.

The present invention provides also the man-driven vehicle equipped with the cover structure and the floor panel according to a forty-ninth aspect of the invention, wherein the openable and closable floor panel section comprises a hinged floor panel section, as described in a fifty-first aspect of the invention.

With this arrangement, the openable and closable floor panel section may be trampled down to open this floor panel section in hinge mode until the free end of this floor panel section comes in contact with the ground and thereby to control the vehicle by the free end so as to be braked or supported.

The present invention provides also the man-driven vehicle equipped with the cover structure and the floor panel according to a fifty-first aspect of the invention, wherein the hinged floor panel section having edges adapted to be in contact with the ground and to brake the vehicle as the hinged floor panel section is opened, as described in a fifty-second aspect of the invention.

The present invention provides also the man-driven vehicle equipped with the cover structure and the floor panel according to any one of a forty-seventh through a fifty-second aspects of the invention, wherein the floor panel extends below the pedals, as described in a fifty-third aspect of the invention.

With this arrangement, the driver can work the foot pedals above the floor panel and thereby reliably protect his or her feet from adverse weather.

The present invention provides also the man-driven vehicle equipped with the cover structure and the floor panel according to any one of a forty-seventh through a fifty-third aspects of the invention, wherein an upright splash board is provided on front or rear part of the floor panel in association with the front wheel or each of the rear wheels, as described in a fifty-fourth aspect of the invention.

With this arrangement, the upright portion rising from the floor panel serve as a splash board operatively associated with the front wheel or the rear wheels.

The present invention provides also the man-driven vehicle equipped with the cover structure and the floor panel according to any one of a forty-seventh through a fifty-fourth aspects of the invention, wherein the cover structure is provided integrally with the floor panel and extends above the floor panel so as to cover substantially whole of the driver, as described in a fifty-fifth aspect of the invention.

With this arrangement, the cover structure substantially covering a whole of the vehicle and the driver allows the driver to be protected from undesirable environmental conditions such as rainfall, cold wind, sandblast and to drive the vehicle without any problem.

The present invention provides also the man-driven vehicle equipped with the cover structure according to any one of a first through a fifty-fifth aspects of the invention, wherein the cover structure is provided with a solar battery, as described in a fifty-sixth aspect of the invention.

With this arrangement, the solar cell provided on the ceiling of the cover structure generates electricity used to energize various lights or to charge an accumulator.

The present invention provides also the man-driven vehicle equipped with the cover structure according to any one of a first through a fifty-sixth aspects of the invention, wherein the cover structure is provided with a front light so that the vehicle can be driven in the night, as described in a fifty-seventh aspect of the invention.

The present invention provides also the man-driven vehicle equipped with the cover structure according to any one of a first through a fifty-seventh aspects of the invention, wherein the front window of the cover structure is provided with a wiper so that the vehicle can be driven in the rain, as described in a fifty-eighth aspect of the invention.

The present invention provides also the man-driven vehicle equipped with the cover structure according to any one of a first through a fifty-eighth aspects of the invention, wherein the cover structure is provided on its rear side with a tail light so that the other vehicles approaching from behind can perceive the present of the vehicle, as described in a fifty-ninth aspect of the invention.

The present invention provides also the man-driven vehicle equipped with the cover structure according to any one of a first through a fifty-ninth aspects of the invention, wherein the vehicle itself has three or more wheels, as described in a sixtieth aspect of the invention.

With this arrangement, the vehicle can stably run without any anxiety that the vehicle might upset so far as the vehicle has three or more wheels.

The present invention provides also the man-driven vehicle equipped with the cover structure according to any one of a first through a sixtieth aspects of the invention, wherein the vehicle itself or the detachable cover structure or the cover structure mounting frame is provided with a battery adapted to be charged as the vehicle runs, as described in a sixty-first aspect of the invention.

With this arrangement, the accumulator can be charged as the vehicle runs and such accumulator can be selectively mounted on the vehicle itself, the detachable cover or the cover mounting frame.

The present invention provides also the man-driven vehicle equipped with the cover structure according to any one of a first through a sixty-first aspects of the invention, wherein the vehicle itself or the cover structure or the cover structure mounting frame is provided with a stationary stand adapted for rotatably supporting the wheels which are rotated as the pedals are worked, as described in a sixty-second aspect of the invention.

With this arrangement, keeping the vehicle in stationary state, for example, indoors, the wheels supported by the stationary stand may be rotated by foot pedal working for health maintenance. The stationary stand may be mounted on the vehicle itself, the cover structure or the cover mounting frame.

The present invention provides also the man-driven vehicle equipped with the cover structure according to any one of a first through a sixty-second aspects of the invention, wherein the cover structure is provided with openable and closable windows for repairing of the vehicle, as described in a sixty-third aspect of the invention.

With this arrangement, the openable and closable windows provided on the cover structure may be opened when it is desired to repair the vehicle.

DESCRIPTION OF THE PREFERRED EMBODIMENTS

Figure 1:
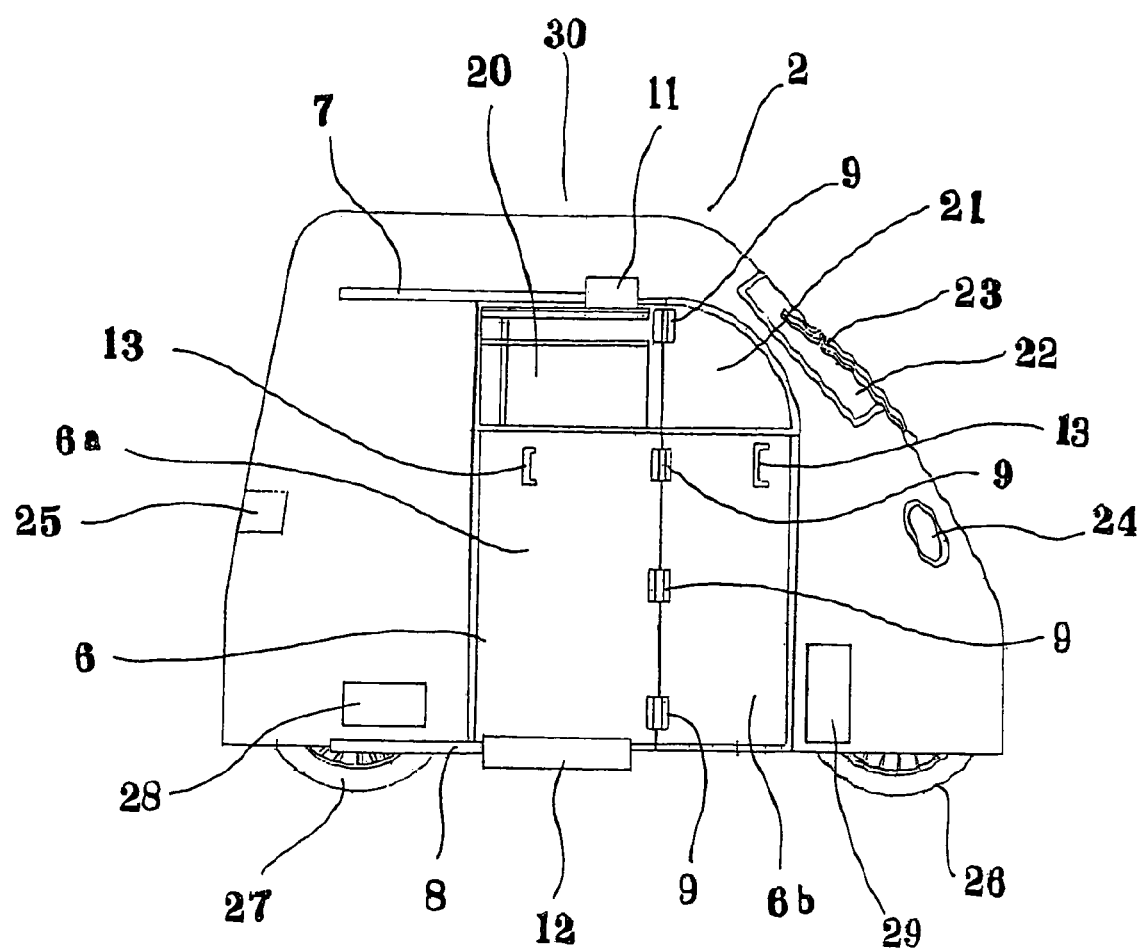
FIG. 1 is a simplified side view showing a first embodiment of the man-driven vehicle equipped with a capsule-like cover structure according to the present invention.
Figure 2:
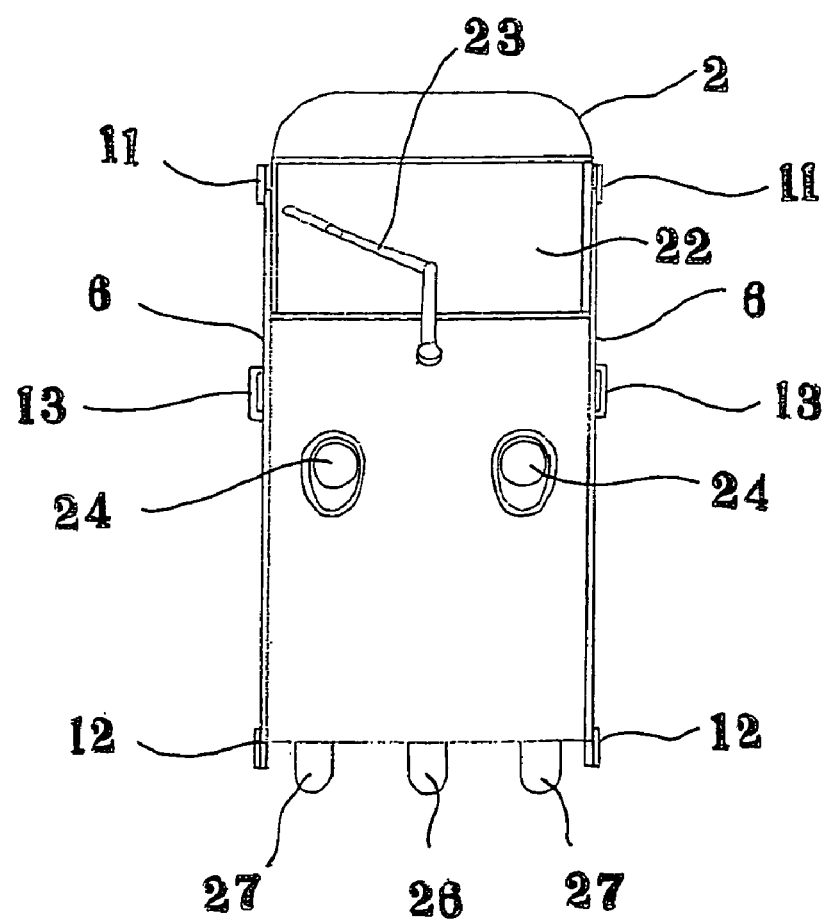
FIG. 2 is a simplified front view showing the first embodiment.
Figure 3:
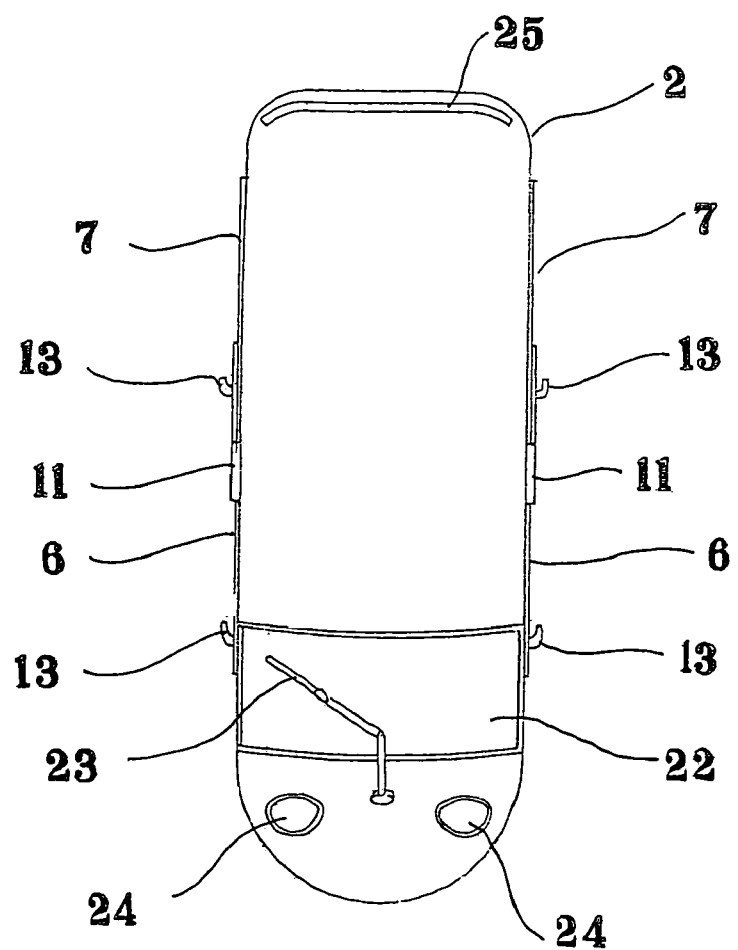
FIG. 3 is a simplified plan view showing the first embodiment.
Figure 4:
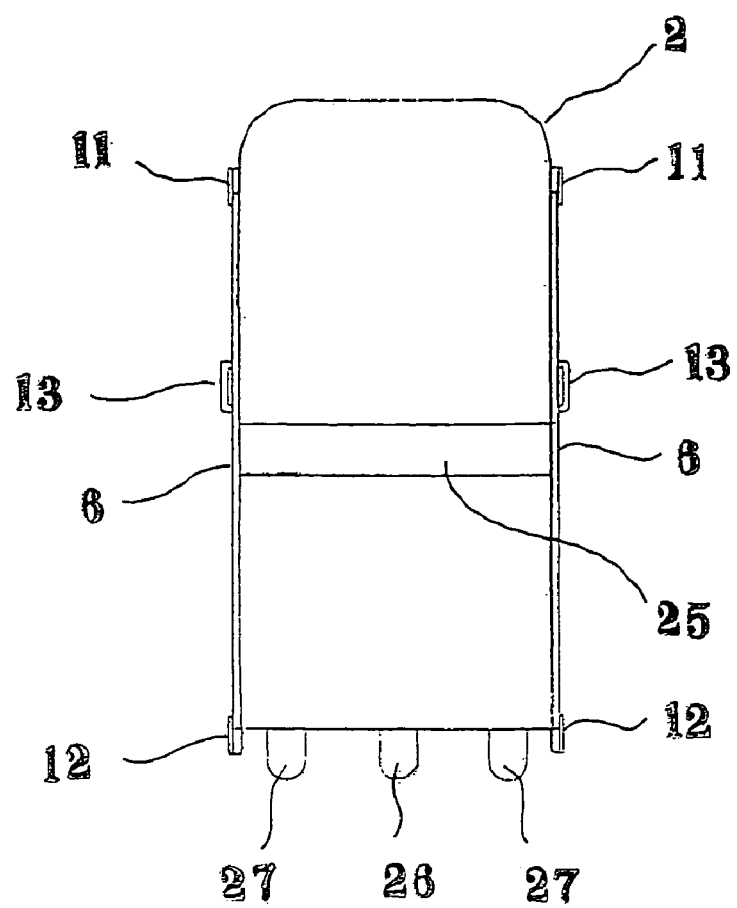
FIG. 4 is a simplified rear view showing the first embodiment.
Figure 5:
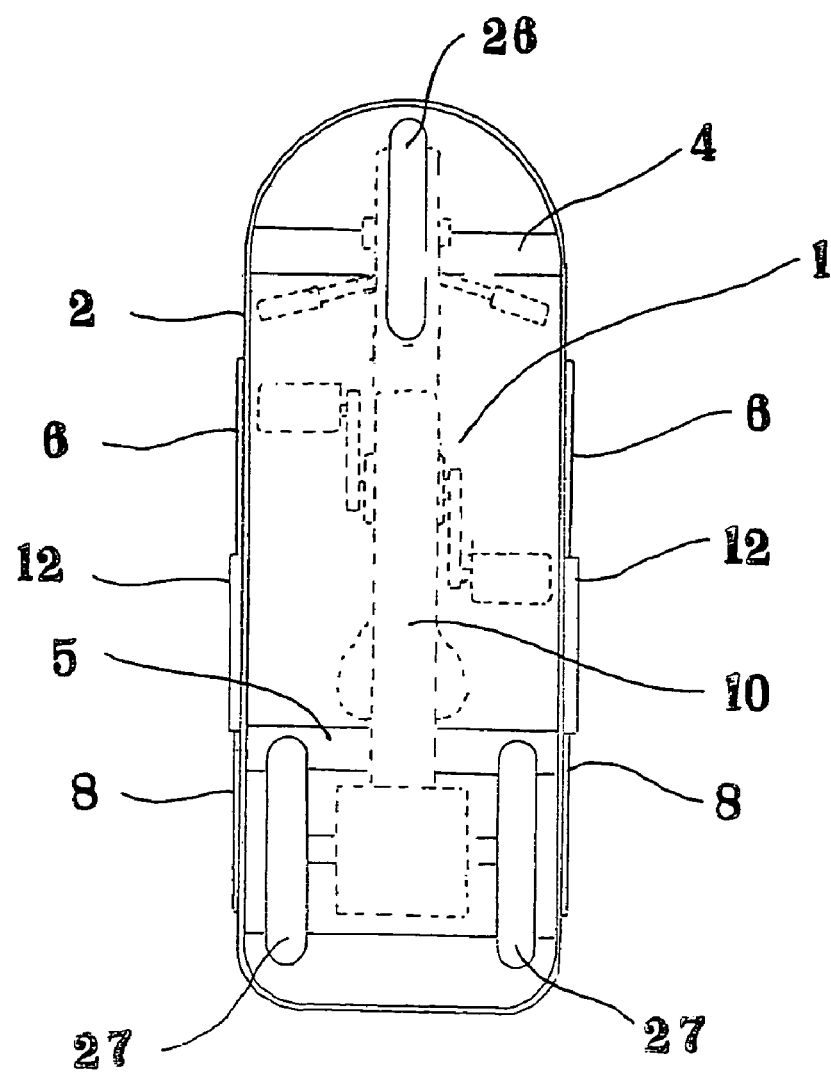
FIG. 5 is a simplified bottom view showing the first embodiment.

The embodiment of the man-driven vehicle equipped with the capsule-like cover structure according to the present invention as shown in FIGS. 1 through 5 comprises a man-driven vehicle itself 1, a cover structure 2 fixed to a frame 10 of the vehicle itself 1 so as to cover a substantially entire vehicle 1 and a door 6 mounted on said cover structure 2 for getting on and off.

In the case of this embodiment, the cover structure 2 comprises a framed work made of transparent, translucent or opaque synthetic resin sheet or the like. If the structure is made of relatively flexible synthetic resin sheet or the like, the cover structure 2 is reinforced by frame members (not shown) and integrally fixed to a frame 10 of the vehicle itself 1 by means of fastener members 4, 5 integrally mounted on the framework or frame members.

In the case of the cover structure 2 made of reinforced plastics or the like, the cover structure 2 holds its shape without aid of any reinforcing means and may be directly fixed to the vehicle itself 1. Compared thereto, if the cover structure 2 is made of flexible synthetic resin sheet or the like, the cover structure 2 may hold its shape with aid of the frame members and integrally fixed to the frame 10 of the vehicle itself 1 by means of the fastener members 4, 5 integrally mounted on the framed work.

The cover structure 2 may be provided with absorption ability for radiations such as UV ray to shield the radiations such as UV ray known to be harmful to human body.

In the embodiment shown by FIGS. 1 through 5, the door 6 really comprises a combination of a slide door section 6a and a hinged door section 6b to be operated in association with each other when the door 6 is opened and closed. Referring to FIG. 1, these slide door section 6a and hinged door section 6b are connected by hinges 9 so that the slide door section 6a is provided on its top and bottom with guide roller members 11, 12 adapted to roll on upper and lower slide members 7, 8 to open the slide door section 6a and simultaneously the hinged door section 6b may be opened to enlarge an opened width of the door 6 with a relatively limited extension of sliding.

In this manner, combination of the slide door with the hinged door advantageously limits a sliding extension of the door 6 in comparison with the case in which the door comprises the slide door alone. Consequently, it can be avoided that the slide members 7, 8 might excessively extend rearward. In addition, it can be ensured that a lateral extension of the hinged door section 6b from the cover structure 1 is appropriately short as the hinged door section 6b is opened. Thus the door 6 can be opened even in a restricted space. Reference numeral 13 designates a doorknob and reference numeral 13b designates a doorknob provided on the inner side of the door.

Figure 6:
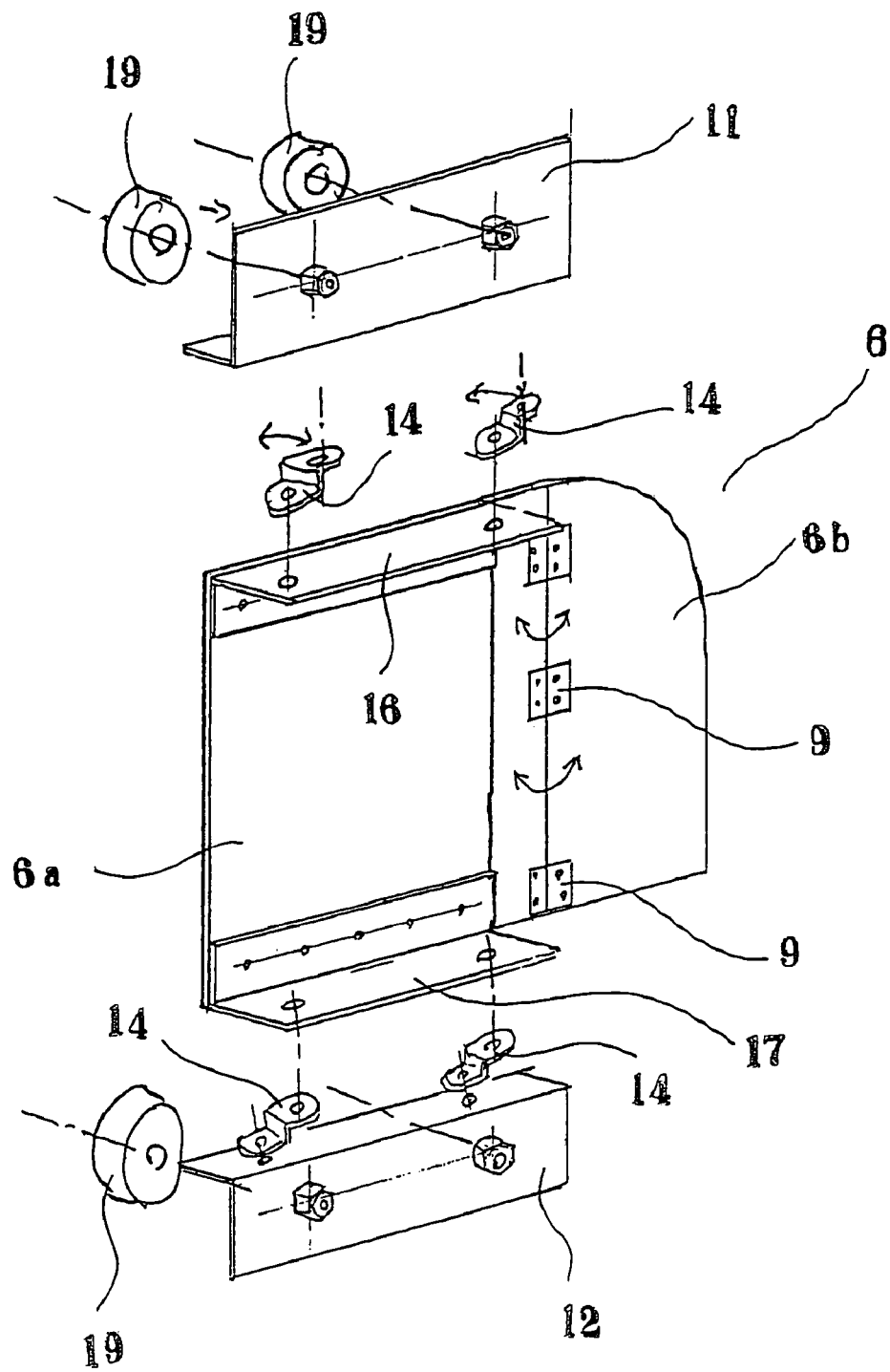
FIG. 6 is a simplified exploded perspective view showing important parts of the first embodiment.
Figure 7:
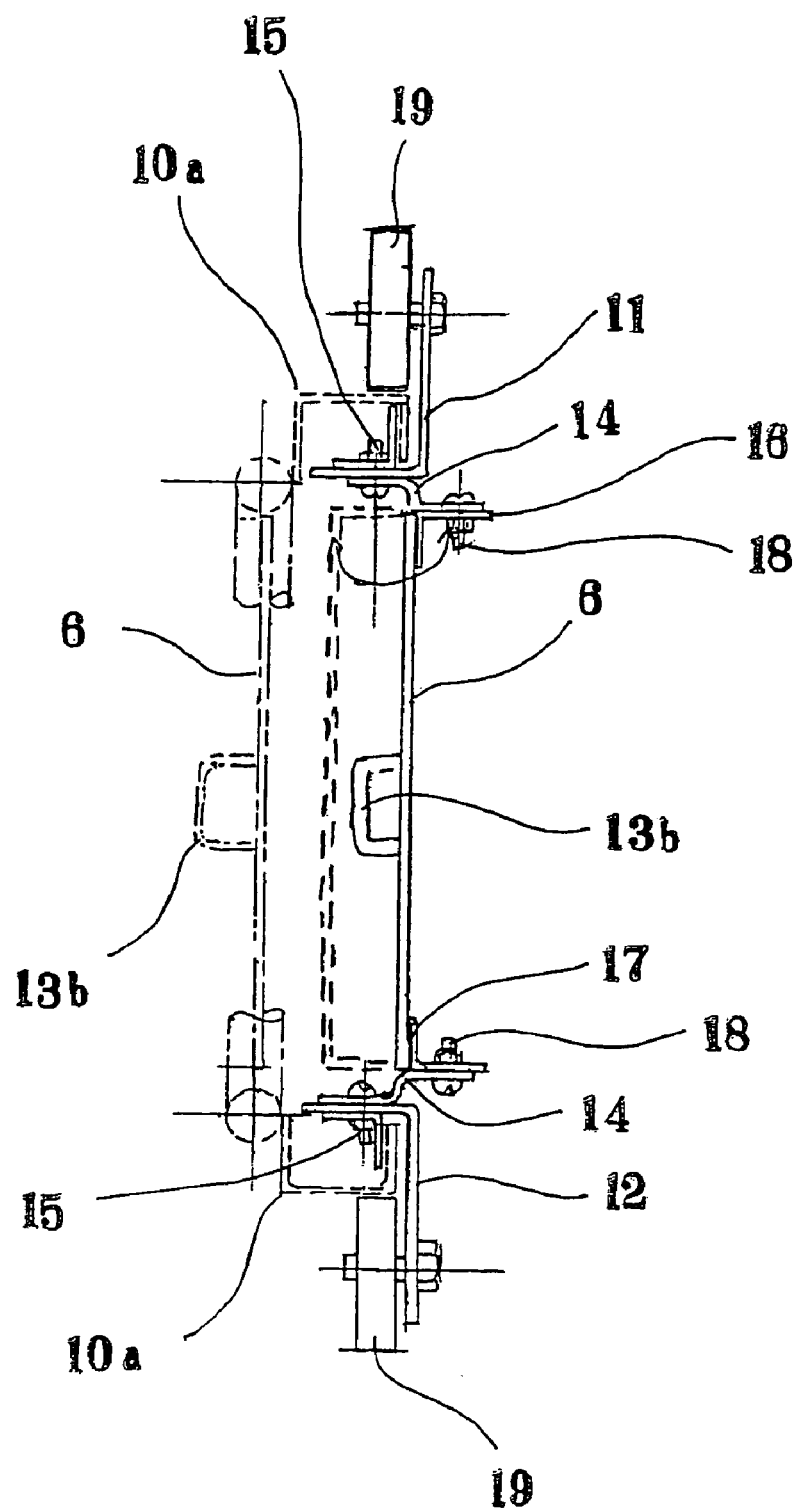
FIG. 7 is a simplified sectional view showing these important parts.

Referring to FIGS. 6 and 7, the door 6 is connected to the upper and lower guide roller members 11, 12 by means of hinge members 14 so that the door 6 may be entirely retracted within a body frame 10a as the door 6 is closed, as indicated by dashed lines in FIG. 7, and may be held in this retracted position during running of the vehicle. Particularly referring to FIG. 7, the hinge members 14 are pivotally connected to the respective guide roller members 11, 12 around pivot pins 15 and pivotally connected to respective door frames 16, 17 around respective pivot pins 18 so that the door 6 is received in its closed, i.e., retracted position as the hinge members 14 are rotated substantially by 90°.

In FIGS. 6 and 7, reference numeral 19 designates guide rollers constituting parts of the respective guide roller members 11, 12.

Referring to FIGS. 1 through 5, the door 6 is provided with a pair of windows 20, 21 wherein the window 20 associated with the slide door section 6a is opened and closed in slide mode.

The door of hinge-slide combination type may be realized also by a pair of doors hinge-connected to each other so that the one door section is pivotally mounted on one side of the door way to be opened or closed and the other door section is opened or closed with its free end sliding along upper or lower end of the door way. In this case, the door is preferably constructed so as to be folded inward of the cover structure 2 and not to project outward of the cover structure 2 when the door is opened or closed.

Figure 8:
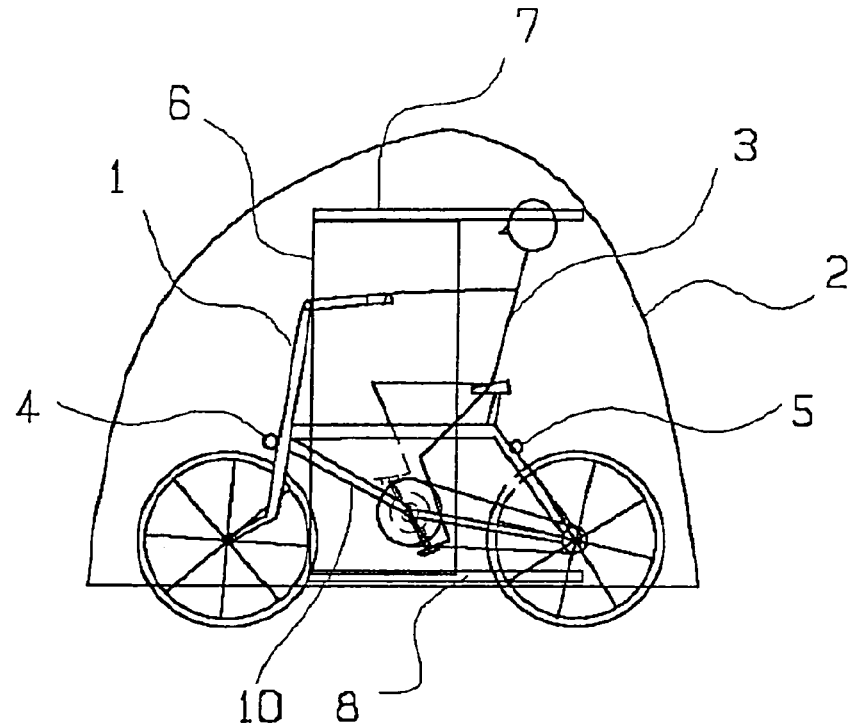
FIG. 8 is a simplified side view showing a second embodiment.

In the case of another embodiment shown by FIG. 8, the door 6 is provided on the lateral side of the cover structure 2 so that the door 6 may be opened or closed in slide mode. The cover structure 2 is provided with the upper and lower slide members 7, 8 along which the door 6 is opened or closed in slide mode. Optionally, the door 6 may be provided on one side or each side of the cover structure 2.

According to this embodiment, the door 6 is adapted to be opened or closed in slide mode in longitudinal direction of the vehicle and thereby to ensure that the driver 3 can get on or off the vehicle through the door way even if there is no adequate free space on both sides of the vehicle. In addition, the door 6 does not project laterally and, in consequence, a relatively large door way is ensured.

Figure 9:
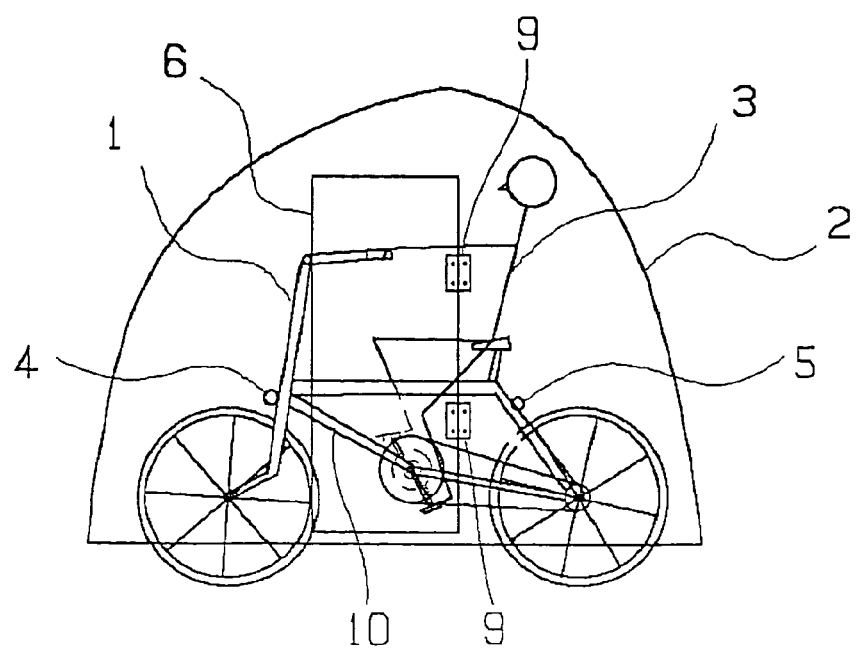
FIG. 9 is a simplified side view showing a third embodiment.

In the case of an embodiment shown by FIG. 9, the door 6 is pivotally opened and closed on the hinges 9.

Alternatively, it is possible in this embodiment to obtain the desired hinge function without separately providing any hinge members. Specifically, a region in the cover structure 2 to be folded may be provided with sufficient flexibility to be easily folded as with aid of the hinge members.

It is also possible in the above-described embodiment to provide a locking member such as magnet, hook-and-loop fastener or the other fastener between the door 6 and the door way of the cover structure 2 so that the door 6 can be releasably locked to the cover structure 2 at the opened or closed position of the door 6. The driver 3 can selectively lock or unlock the door 6 to get on or off the vehicle and can drive with the door 6 held open, if desired to take in fresh and cool wind, for example, in heat weather of summer.

Alternatively, the door 6 as a whole may be attached to the door way of the cover structure 2 by releasable locking member such as the magnet, the hook-and-loop fastener or the other fastener so that the driver 3 can completely detach or attach from and to the cover structure 2 to get on or off the vehicle and, if desired, to remove the door 6.

In the case of the embodiment shown by FIGS. 1 through 5, the front of the cover structure 2 is provided with a front window 22, which is, in turn, provided with a wiper 23, and with head lights 24 used in night so as to be visible from the sides also. The cover structure 2 is provided on its rear side with a sufficiently wide tail light 25 having a reflecting function to be visible from the sides also. The tail light 25 can be used also as a brake lamp.

Referring again to FIG. 1, reference numerals 28, 29 designate openable and closable windows provided at appropriate regions of the cover structure for repair of the vehicle so that these windows may be opened to repair vehicle's parts such as tire and chain.

It is possible to provide on a ceiling 30 with solar cell integrally with the ceiling 30 so that a battery equipped in the vehicle may be charged during daylight and the various lights such as the head light of the vehicle may be energized during running at night.

The vehicle itself 1 can be equipped with the cover structure 2 no matter whether the vehicle is two-wheeled, three-wheeled or four-wheeled vehicle so far as the vehicle itself 1 has an appropriate framework. However, the vehicle 1 preferably has three or more wheels in order to avoid an apprehension that cross wind against the cover structure 2 might upset the vehicle 1.

In FIGS. 1 through 5, reference numeral 26 designates a front wheel and reference numeral 27 designates a rear wheel.

Now the man-driven vehicle equipped with the cover structure according to an embodiment shown by FIGS. 10 and 11 will be described, in which an openable and closable door way comprises a detachable cover structure.

Figure 10:
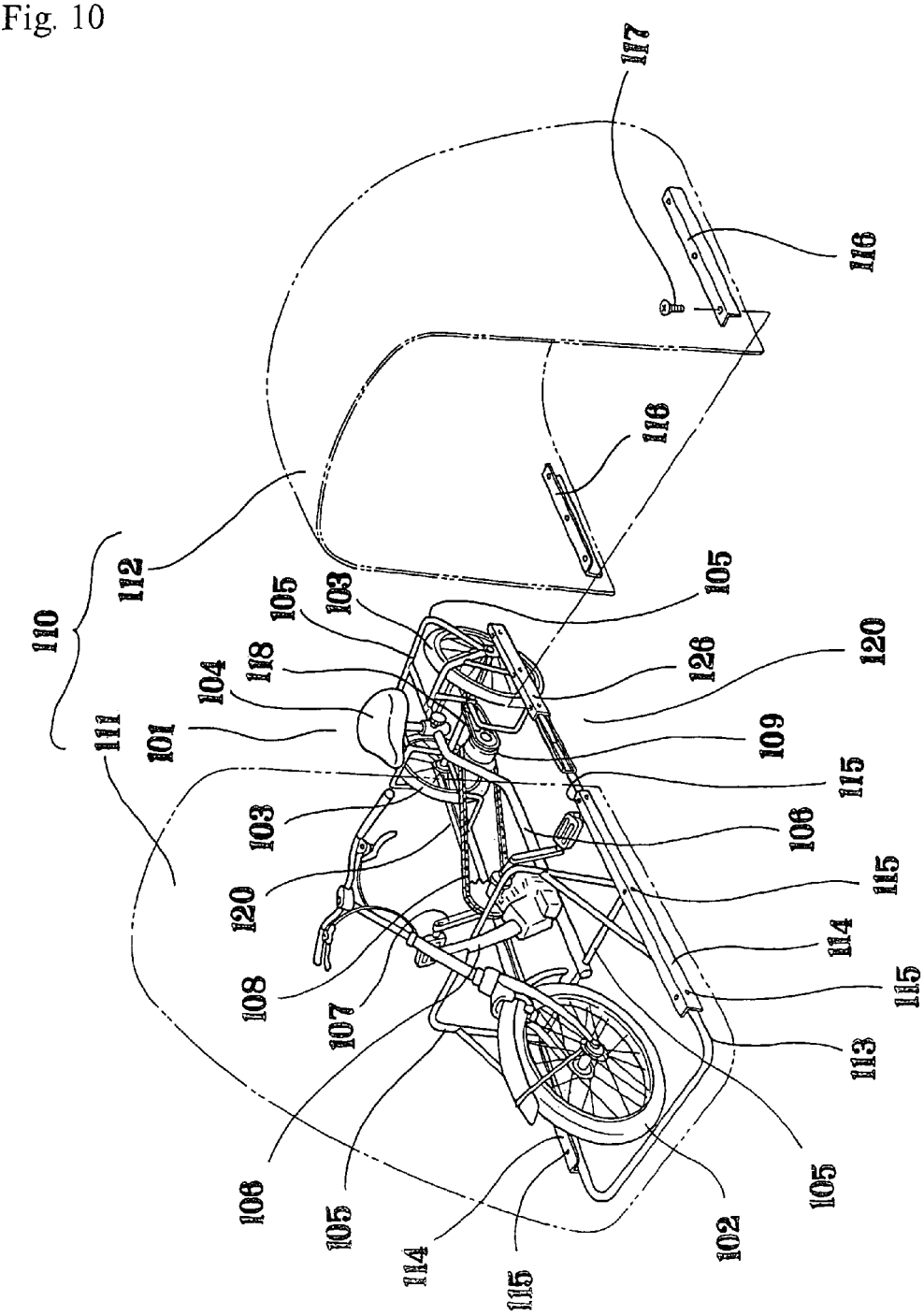
FIG. 10 is a simplified side view showing a fourth another embodiment.

Referring to FIG. 10, reference numeral 110 designates a cover structure substantially covering whole of a vehicle itself 101 wherein a front half of the cover structure 110 is integral with the vehicle itself 101 in the form of a stationary cover structure 111 and a rear half is in the form of a detachable cover structure 112.

Along joint edges, the stationary cover structure 111 and the detachable cover structure 112 may have U-shaped cross-section and T-shaped cross-section, respectively, adapted to be water-tightly engaged with each other or may water-tightly overlap each other, both against weather. It is possible to provide in the vicinity of the joint with an operating knob to open or close the cover structure 110.

In the case of this embodiment, the cover structure 110 is made of transparent, translucent or opaque synthetic resin sheet or the like. The cover structure 110 made of relatively flexible synthetic resin sheet or the like will be fixed to a cover structure mounting frame 113 to reinforce the cover structure 110. Then the cover structure 110 will be integrally fixed to the vehicle itself 101 by the framework which is integral with the vehicle itself 101.

The cover structure 110 made of reinforced plastics or the like will hold its shape by itself and can be directly fixed to the vehicle itself 101. The cover structure 110 made of flexible synthetic resin sheet, on the other hand, will hold its shape by a separately provided framework and integrally fixed to the cover structure mounting frame 113 of the vehicle itself 101 by means of the framework.

The cover structure 110 may be UV shielding material to protect human body from harmful UV.

Reference numeral 114 designates mounting angle members being integral with the cover structure mounting frame 113 used to mount the front stationary cover structure 111 on the vehicle. Though not shown, the stationary cover structure 11 is provided on its both sides with angle members of shapes identical to those of the mounting angle members 113 so that the respective mounting angle members 113 may be placed upon the associated angle members and fixed one to another by means of fixing means 115.

In the case of this embodiment, the vehicle itself 1 is a tricycle having a front wheel 102 for steerage and a pair of rear wheels 103 serving to support a saddle 104. The cover structure mounting frame 113 is held by locking means 105 integrally mounted on the body frame 106 so as to extend in parallel to both sides of the front wheel as well as the rear wheels.

Longitudinally opposite ends of the cover mounting frame 113 describe U-shapes adapted to protect the front wheel 102 and the rear wheels 103 from front and behind, respectively, and serve also as bumpers. The frame 113 is provided on both sides of its rear part with rail members 120 adapted to guide the detachable cover 112 in the longitudinal direction of the vehicle.

Figure 11:
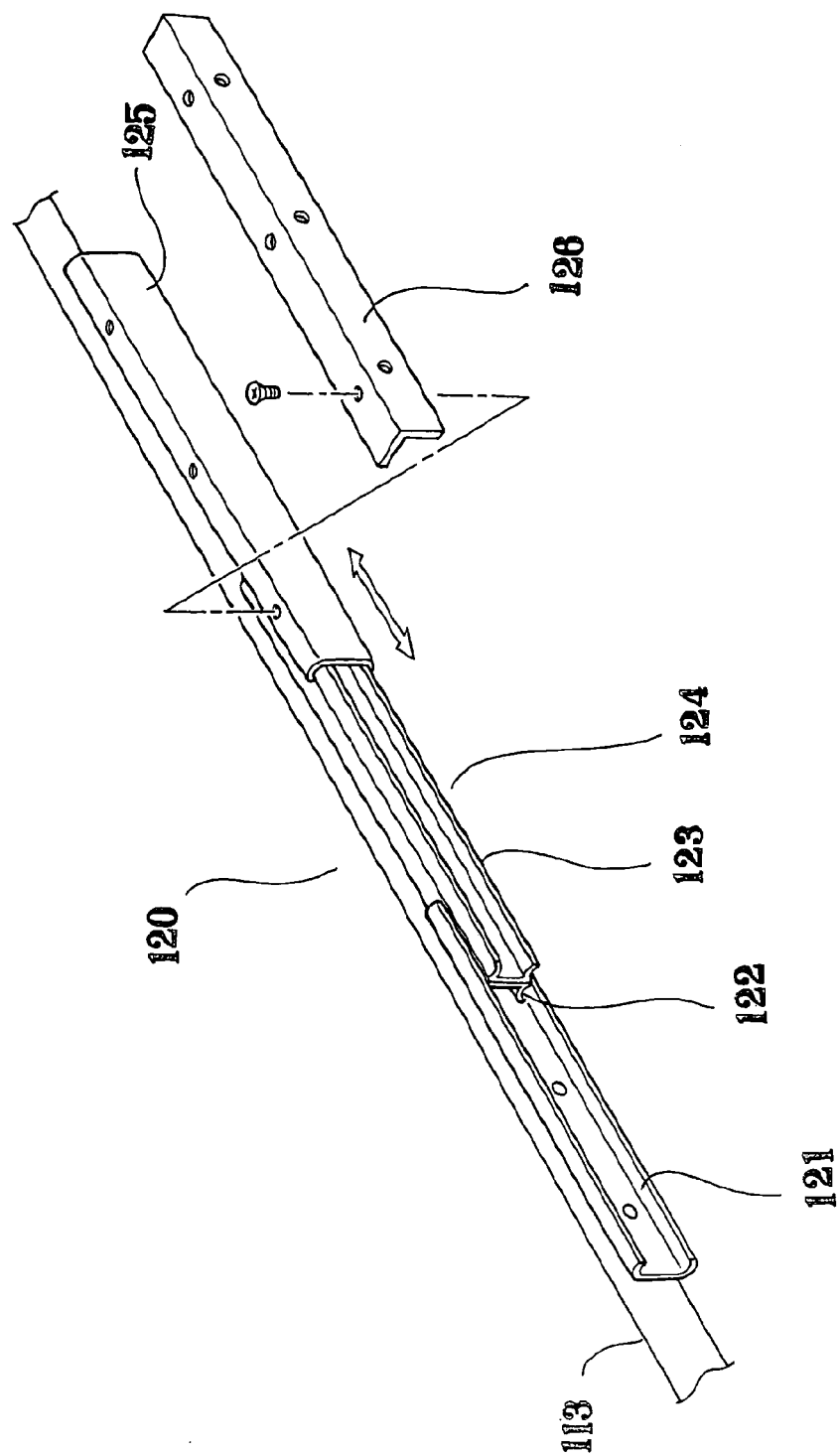
FIG. 11 is a simplified perspective view showing important parts of the fourth embodiment.

According to this embodiment, each of the rail members 120 comprises, as best seen in FIG. 11, a stationary rail member 121 fixed to the lateral surface of the cover mounting frame 113 and having a C-shaped cross-section, a compromise rail member 124 integrally having a first connector rail member 122 slidably engaged with the stationary rail 121 with a square U-shaped cross-section and a second connector rail member 123 extending along outer side of the first connector rail member 122 with a C-shaped cross-section, a guide rail 125 slidably engaged with the compromise rail 124 with a square U-shaped cross-section, and a mounting angle 126 integrally fixed to the guide rail 125 by means of set screws 127 or the like.

As shown in FIG. 10, angle members 116 integrally mounted on the detachable cover 112 are fixed to the respective mounting angles 126 by means of set screws 117 or the like. The guide rail 125 is detached from the second connector rail member 123 of the compromise rail member 124 as the detachable cover 112 is pulled rearward and thus the detachable cover 112 can be removed.

Alternatively, it is possible to provide a stopper adapted to prevent the compromise rail member 124 from falling off from the stationary rail member 121. It is also possible to provide a stopper between the guide rail 125 and the second connector rail member 123 of the compromise rail member 124 so that the compromise rail member 124 can be removed together with the guide rail 125 from the stationary rail member 121 and thus the detachable cover 112 can be removed.

A further alternative arrangement is also possible such that the compromise rail member 124 is eliminated and the guide rail 125 is movably engaged directly with the stationary rail member 121.

In this way, the detachable cover 112 having moved along the rail member 120 to the end of the rail member 120 in the vicinity of which the detachable cover 112 can be removed and the guide rail 125 can be easily attached to the stationary rail member 121.

Though not illustrated, the cover structure may be provided with knobs, side windows, a front window, a rear window, side mirrors, wipers, head lights for running in night and a tail light having a reflecting function.

Reference numeral 107 designates foot pedals of which a driving is transmitted by a chain 108 extending between sprockets to an intermediate shaft, then transmitted to an axle of the rear wheels 103 by a chain 118 extending between the intermediate shaft and the axle of the rear wheels 103. The intermediate shaft contains therein a driving motor and a generator 109.

Reference numeral 119 designates a space for storage of the battery or the like and connected by wiring (not shown) to the battery, the driving motor and the generator 109.

It is possible to mount components such as the battery, the electric circuit and the wiring on the cover mounting frame 113 and the stationary cover 112.

Though not illustrated, the vehicle itself 101, the body frame 106, the detachable cover 112 or the cover mounting frame 113 may be provided with a stationary stand used to keep the vehicle stationary while the wheels are rotated by pedal working. Such stationary stand is useful when the wheels are rotated by pedal working for health maintenance indoors with the vehicle kept stationary. The stationary stand may be selectively mounted on the vehicle itself, the detachable cover or the cover mounting frame.

Referring now to FIGS. 12 through 16, an embodiment of the man-driven vehicle equipped with the cover structure will be described, wherein the openable and closable door way is defined by the rotatable cover.

Reference numeral 210 designates a cover structure substantially covering a whole of a vehicle itself 201 wherein a front part as well as a rear-lower part of the cover structure 210 form together a stationary cover 211 being integral with the vehicle itself 201. A rear-upper part of the cover structure 210 defines a rotatable cover 212.

Except schematically illustrated a driver seat 202, driving mechanism 203, 204, 205, 206, 207, and front and rear wheels 208, 209, details of the vehicle itself 201 are not illustrated. When a user U on the seat 202 drives a driving wheel 203 by means of the foot pedals, an intermediate wheel 205 is rotated by means of a chain 204, then a driven wheel 207 is rotated by means of a chain 206 and then the rear wheels 209 are driven.

In this embodiment, the vehicle itself 201 is a tricycle having the front wheel 208 serving for steerage and a pair of the rear wheels 209.

Reference numeral 213 designates a rear cover upon which the rotatable cover 212 is placed when the latter is opened. While the rear cover 213 may be integral with the stationary cover 211, an alternative arrangement is also possible such that the rear cover 213 can be removed together with the rotatable cover 212 from the stationary cover 211.

The joints of the stationary cover 211, the rear cover 213 and the rotatable cover 212 may be weather-tightly sealed in projection-recess engaging mode or in overlapping mode, and there may be provided in the vicinity of these joints with detachable devices or stationary knobs by which the rotatable cover 212 is opened or closed.

In the case of this embodiment, the cover structure 210 is made of transparent, translucent or opaque synthetic resin sheet or the like and when the cover structure 210 is made of relatively flexible synthetic resin sheet or the like, the cover structure 210 maybe reinforced by attaching the cover structure 210 to the cover mounting frame which forms of the framework of the structure and integrally mounted on the vehicle itself 201 by such frame work which is, in turn, integral with the vehicle itself 201.

When the cover structure 210 is made of reinforced plastics or the like, the cover structure 210 can hold its shape by itself and can be fixed directly to the vehicle itself 201.

The cover structure 210 may be made of UV shielding material to protect the driver from harmful UV.

Figure 15:
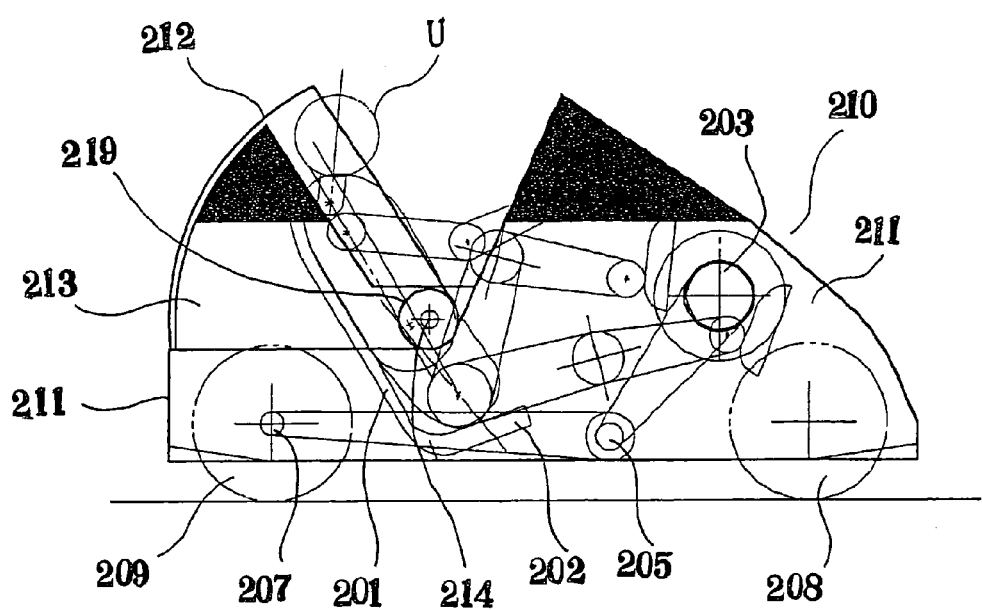
FIG. 15 is a diagram schematically illustrating a manner in which the important parts of the fifth embodiment operate.
Figure 16:
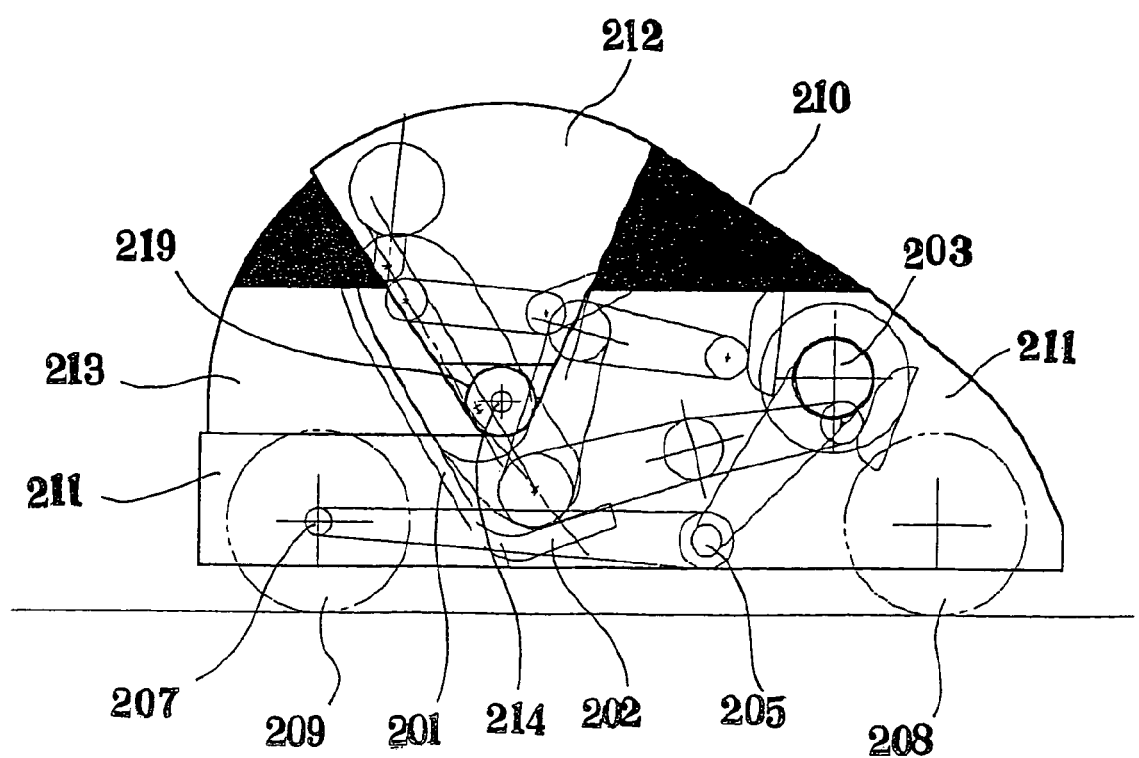
FIG. 16 is a diagram schematically illustrating another manner in which the important parts of the fifth embodiment operate.

As best seen in FIGS. 15 and 16, the rotatable cover 212 is rotatable around a rotary shaft 214 between an opened position as shown in FIG. 15 and a closed position as shown in FIG. 16. In fine weather, the rotatable cover 212 may be opened to enjoy an outer landscape or to respire fresh air. When the foot pedals are worked indoors for health maintenance or battery charging with the vehicle kept stationary, the ceiling of the cover structure maybe opened. In adverse weather or environment, the rotatable cover 212 may be closed so that the contact cover structure 210 substantially covering a whole of the vehicle to drive the vehicle without any problem.

Figure 12:
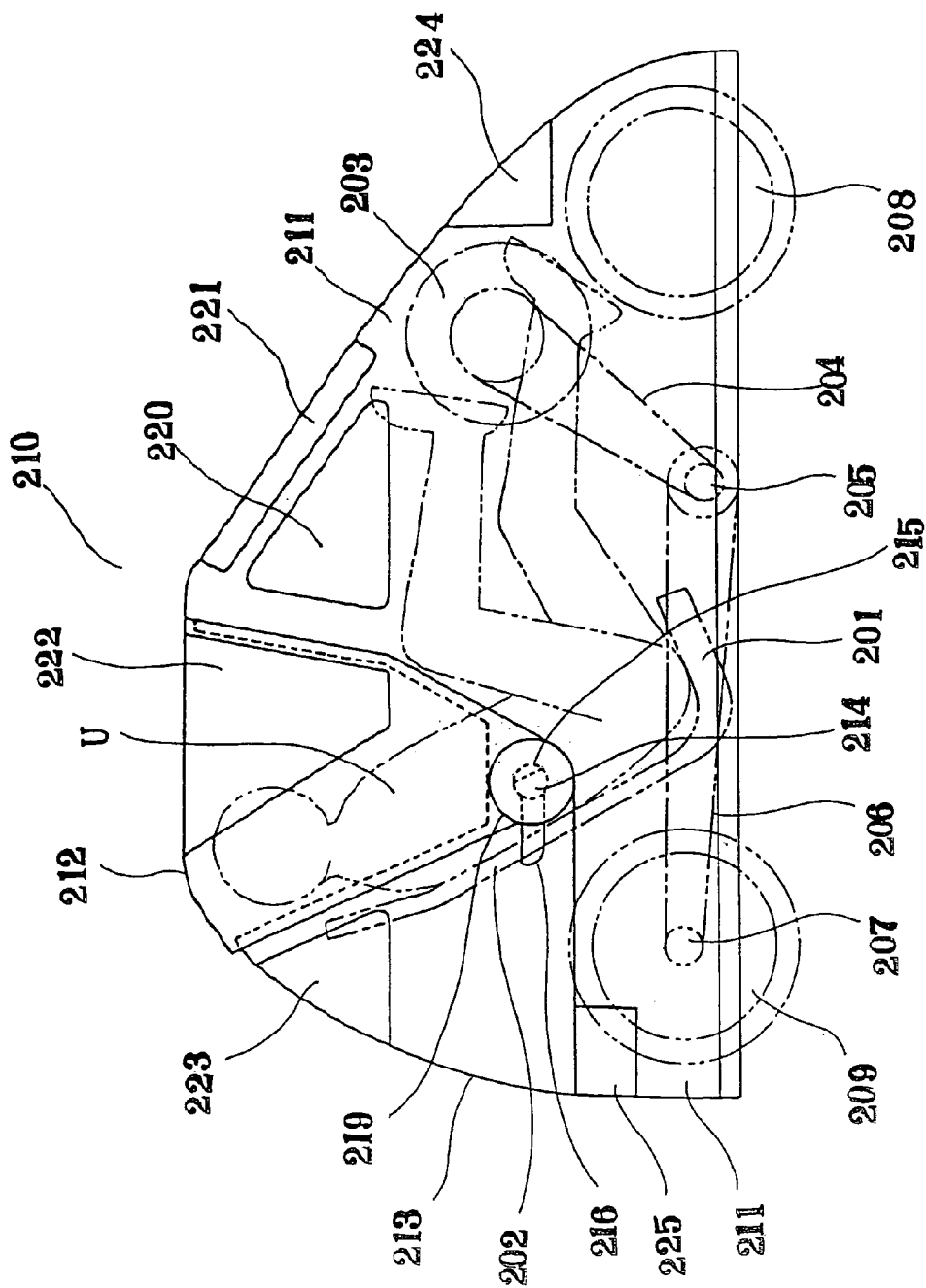
FIG. 12 is a simplified side view showing a fifth embodiment.
Figure 13:
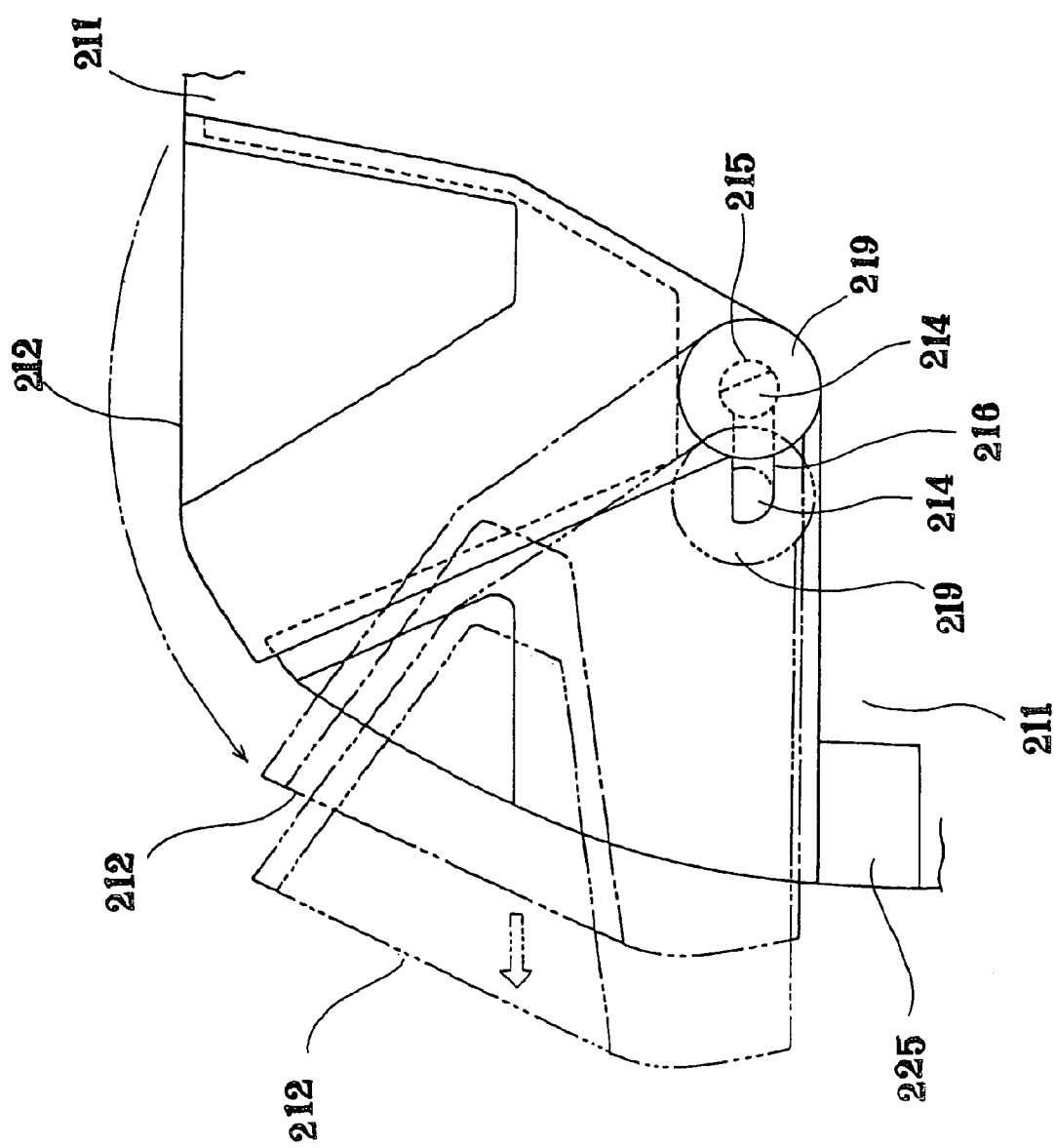
FIG. 13 is a diagram schematically illustrating important parts of the fifth embodiment.
Figure 14:
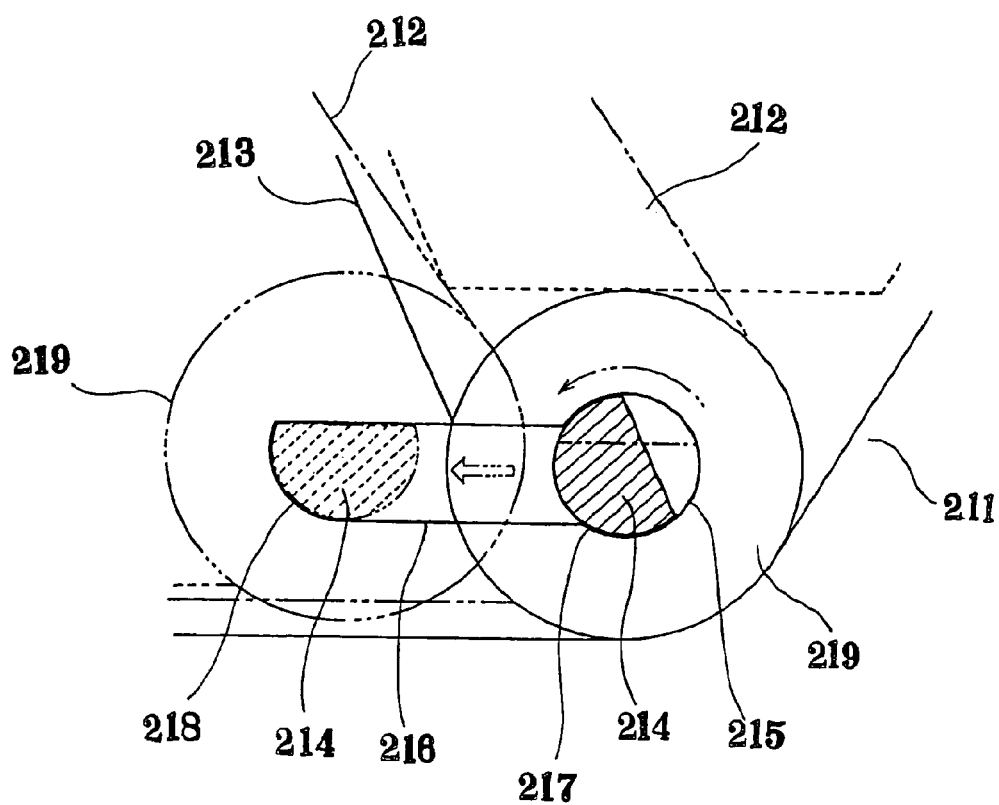
FIG. 14 is a scale-enlarged diagram schematically illustrating the important parts of the fifth embodiment.

The rotary shaft 214 is rotatably received in a cylindrical bearing 215 and, in the embodiment shown by FIGS. 12 through 14, the rotary shaft 214 has a D-shaped cross-section.

A diameter-reduced slide bearing 216 extends rearward from the cylindrical bearing 215 so that the rotary shaft 214 may slide into the slide bearing 216 as indicated by imaginary lines in FIG. 14 as the rotary shaft 214 has been rotated together with the rotatable cover 212 to its opened position. While the rotatable cover 212 is set to be rotated together with the rotary shaft 214 by about 60° in the case of the this embodiment, the angle of rotation may be selectively set to 30° through 90° or more.

According to this embodiment, an opened area of the ceiling as well as of the both sides can be adjusted by sliding the rotatable cover 212 in the longitudinal direction of the vehicle as illustrated in FIG. 13. The rotatable cover 212 may be slid rearward to facilitate the driver to get one or off the vehicle As best seen in FIG. 14, the slide bearing 216 lies at a higher level than the cylindrical bearing 215 with the level difference defined by a step 217. After has been rotated, the rotatable cover 212 can not easily move to the slide bearing 216 so far as the rotary shaft 214 is lifted. In this manner, the slide bearing 216 serves as a positioning stopper means.

Alternatively, a rear end 218 of the slide bearing 216 also may be provided with a recess serving to position and stop the rotary shaft 214 via a step similar to the step 217.

Reference numeral 219 designates a circular operating member adapted to rotate and to slide the rotatable cover 212 integrally with rotary shaft 214.

An arrangement is possible in which the rotatable cover 212 alone or integrally with the rear cover 213 can be removed. With this arrangement, the rotatable cover may be removed in fine weather to enjoy beautiful outer landscape and to respire fresh air. When the foot pedals are worked indoors with the vehicle kept stationary for health maintenance or battery charging, the rotatable cover may be removed.

Furthermore, the cover structure 210 may be provided with knobs, side windows 220, a front window 221, a ceiling window 222, a rear window 223, side mirrors, wipers, head lights 224 for running in night and tail lights 225 having a reflecting function.

Though not illustrated, the driving wheel 203 driven by the foot pedals, the intermediate wheel 205 or the driven wheel 207 is provided with the driving motor, the generator and the battery adapted to be charged by foot pedal working. It is possible to mount components such as the battery, the electric circuit and the wiring on the cover mounting frame or the stationary cover 211.

Though not illustrated, the vehicle itself 201, the body frame, the stationary cover 211 or the cover mounting frame may be provided with a stationary stand used to keep the vehicle stationary while the wheels are rotated by pedal working. Such stationary stand is useful when the wheels are rotated by pedal working for health maintenance indoors with the vehicle kept stationary. The stationary stand may be selectively mounted on the vehicle itself, the rotatable cover or the cover mounting frame.

Referring now to FIGS. 17 through 21, an embodiment of the man-driven vehicle equipped with the cover structure substantially covering a whole of the vehicle is described, in which the openable and closable door way is defined by the rotatable cover integral with the slide cover.

Figure 19:
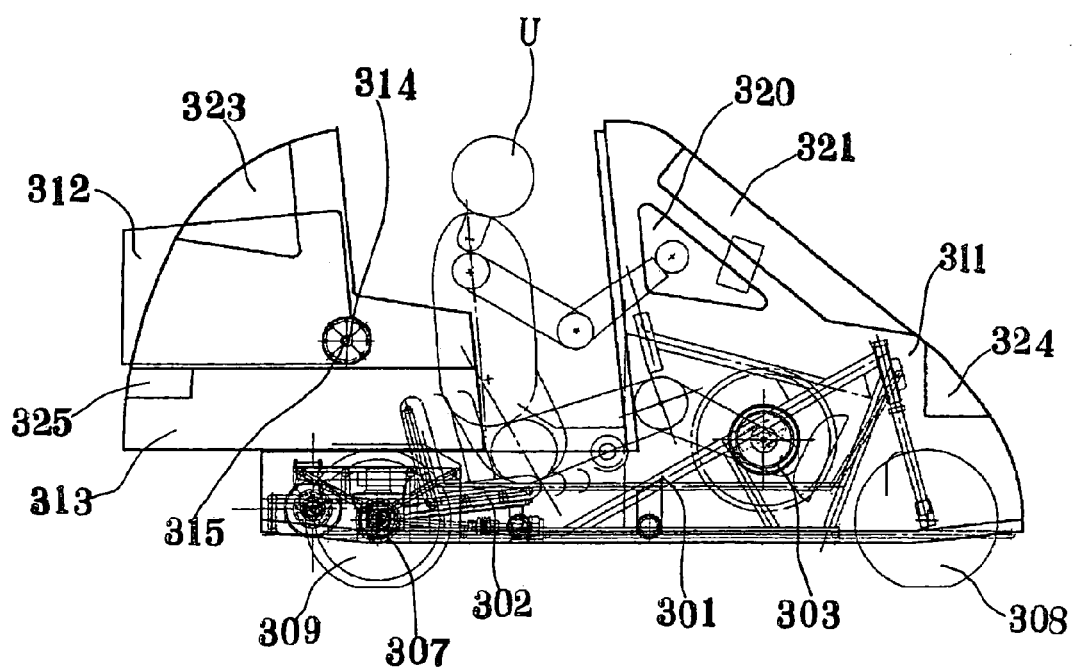
FIG. 19 is a diagram schematically illustrating another manner in which the important parts of the sixth embodiment operate.
Figure 20:
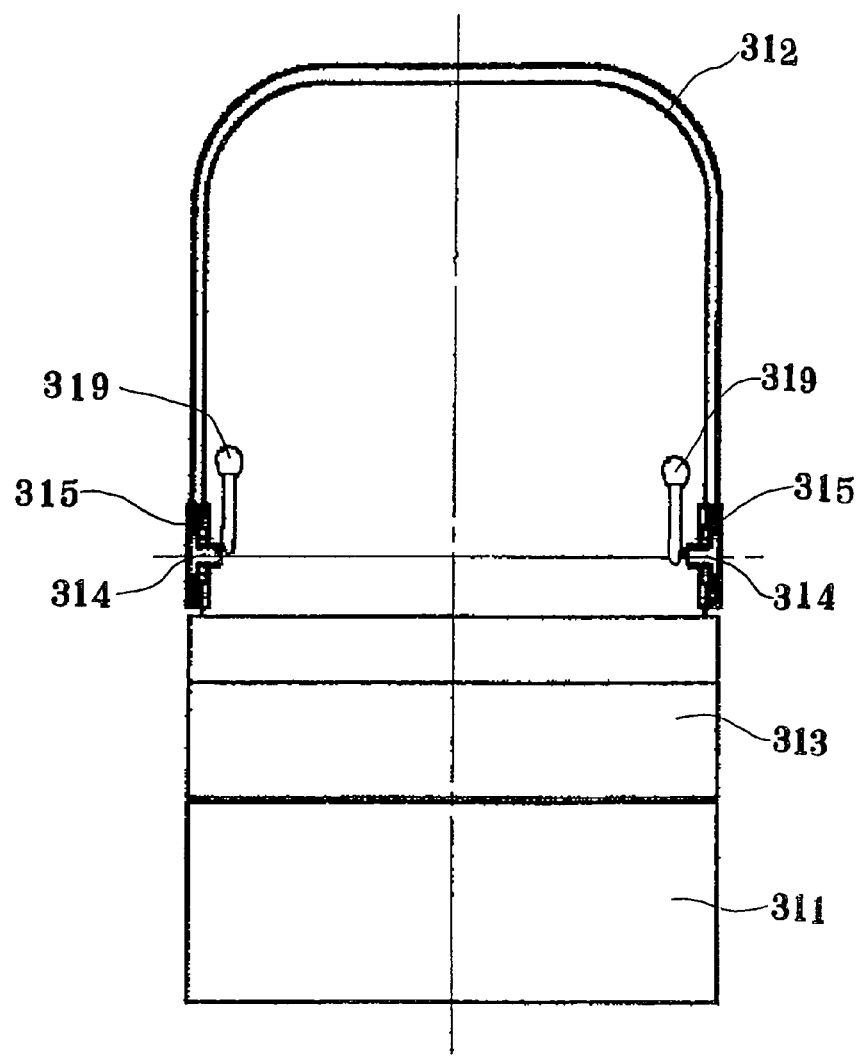
FIG. 20 is a front view showing the important parts of the sixth embodiment.

Reference numeral 310 designates the cover structure substantially covering a whole of a vehicle itself 301 wherein a front part as well as a rear-lower part of the cover structure 310 form together a stationary cover 311 being integral with the vehicle itself 301. A rear-upper part of the cover structure 310 defines a slide cover 313 adapted to slide rearward as illustrated by FIG. 19.

A rotatable cover 312 is mounted on the slide cover 313 so as to be rotated integrally with a rotary shaft 314 and to be rotated by an operating knob 319.

The rotary shaft 314 is rotatably received in a circular rotary bearing 315 integrally fixed to the slide cover 313.

Except schematically illustrated a driver seat 302, driving member 303, driven member 307, and front and rear wheels 308, 309, details of the vehicle itself 201 are not illustrated. When a user U on the seat 302 drives a driving member 303 by means of the foot pedals, a driven wheel 307 is rotated by means of a chain or the like and then the rear wheels 309 are driven.

In this embodiment, the vehicle itself 301 is a tricycle having a front wheel 308 for steerage and a pair of rear wheels 309.

Figure 17:
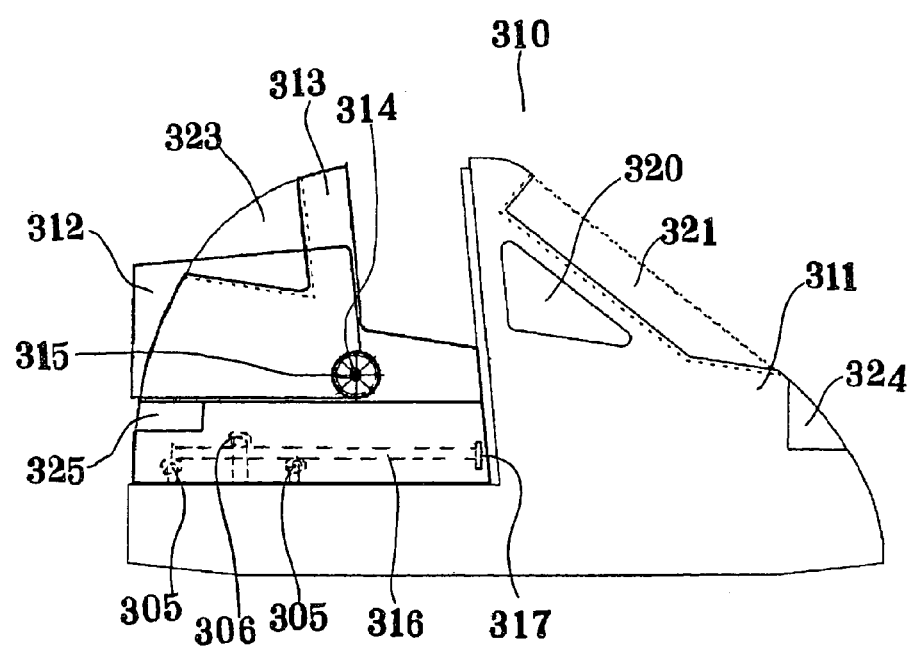
FIG. 17 is a simplified diagram illustrating important parts of a sixth embodiment.
Figure 18:
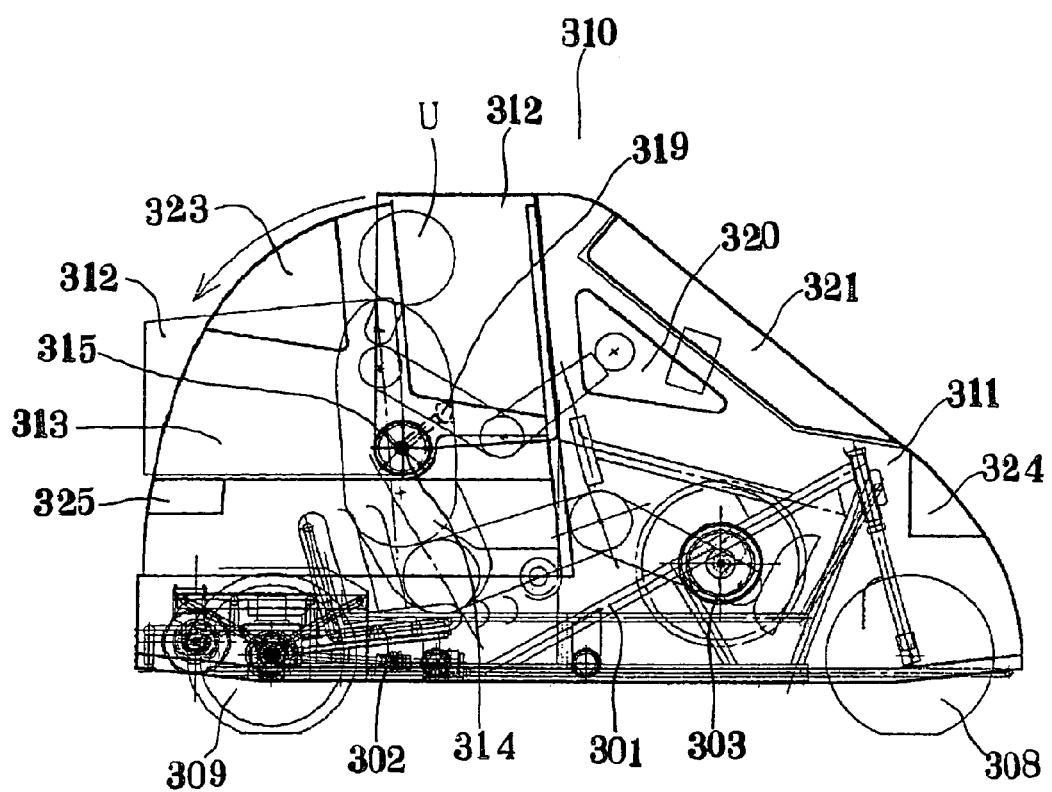
FIG. 18 is a diagram schematically illustrating a manner in which the important parts of the sixth embodiment operate.
Figure 21:
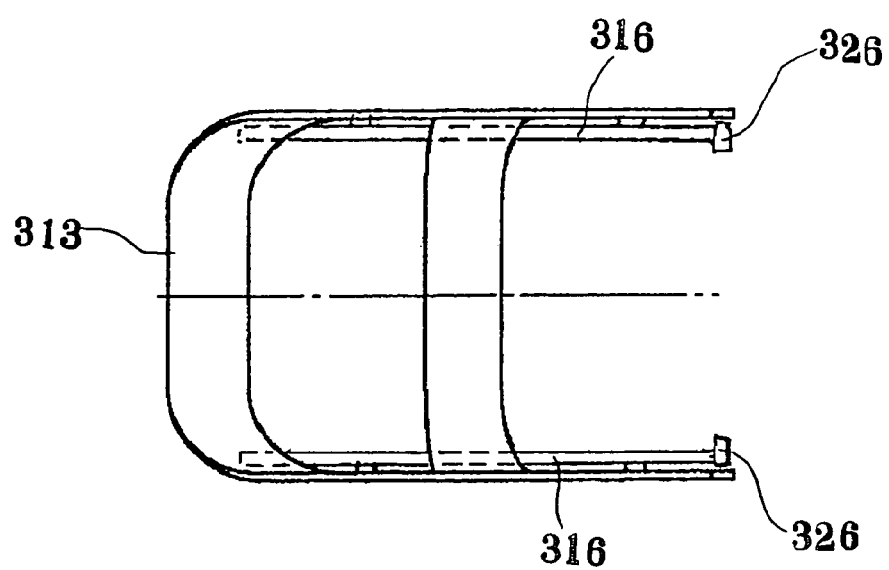
FIG. 21 is a plan view showing the important parts of the sixth embodiment.

The slide cover 313 is provided on its inner side, as shown by FIG. 17 or 21, with slide rail members 316 extending in a horizontal direction and the stationary cover 311 is provided guide rollers 305, 306 adapted to guide the respective slide rail members 316.

Reference numeral 317 designates stopper members provided on ends of the respective slide rail members 316 and adapted to come in contact with the respective guide rollers 305 at the slide limits. It is possible to provide supports for the guide rollers 305, 306 or the stopper members with means such as retractable or extensible/contractile means so that the stopper members 317 can be moved beyond the guide rollers 305, 306 and thereby the slide cover 313 can be detached from or attached to the stationary cover 311.

The joints of the stationary cover 311, the slide cover 313 and the rotatable cover 312 may be weather-tightly sealed in projection-recess engaging mode or in overlapping mode, and there may be provided in the vicinity of these joints with detachable devices or stationary knobs by which the rotatable cover 212 is opened or closed.

In the case of this embodiment, the cover structure 310 comprises a framed work made of transparent, translucent or opaque synthetic resin sheet or the like. If the structure is made of relatively flexible synthetic resin sheet or the like, the cover structure 310 is reinforced by mounting the cover structure 310 to the cover mounting frame for skeleton and integral with the vehicle 301.

An arrangement is possible in which the rotatable cover 312 alone or integrally with the slide cover 313 can be removed. With this arrangement, the slide cover may be removed in fine weather to enjoy beautiful outer landscape and to respire fresh air. When the foot pedals are worked indoors with the vehicle kept stationary for health maintenance or battery charging, the rotatable cover 312 may be removed together with the slide cover.

Furthermore, the cover structure 310 may be provided with knobs, side windows 320, a front window 321, a ceiling window 322, a rear window 323, side mirrors, wipers, head lights 324 for running in night and tail lights 325 having a reflecting function.

Referring now to FIGS. 22 through 26, an embodiment of the man-driven vehicle equipped with the cover structure wherein an openable and closable door way comprises a plurality of rotatable cover sections.

Figure 22:
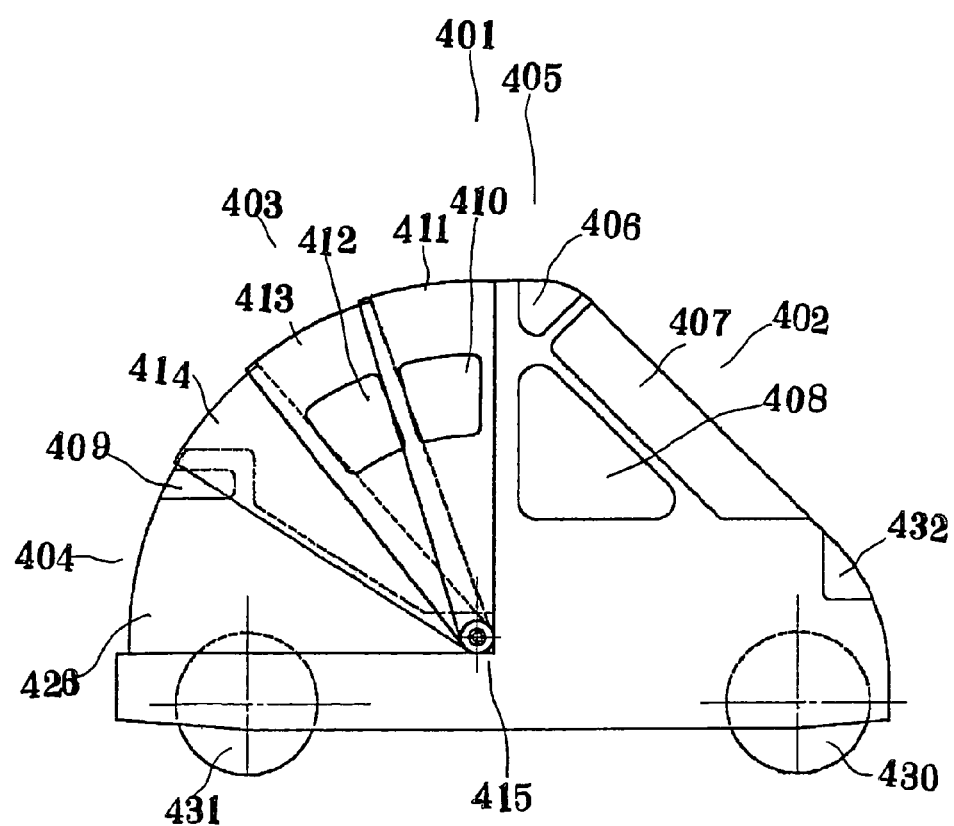
FIG. 22 is a simplified side view showing a seventh embodiment.
Figure 23:
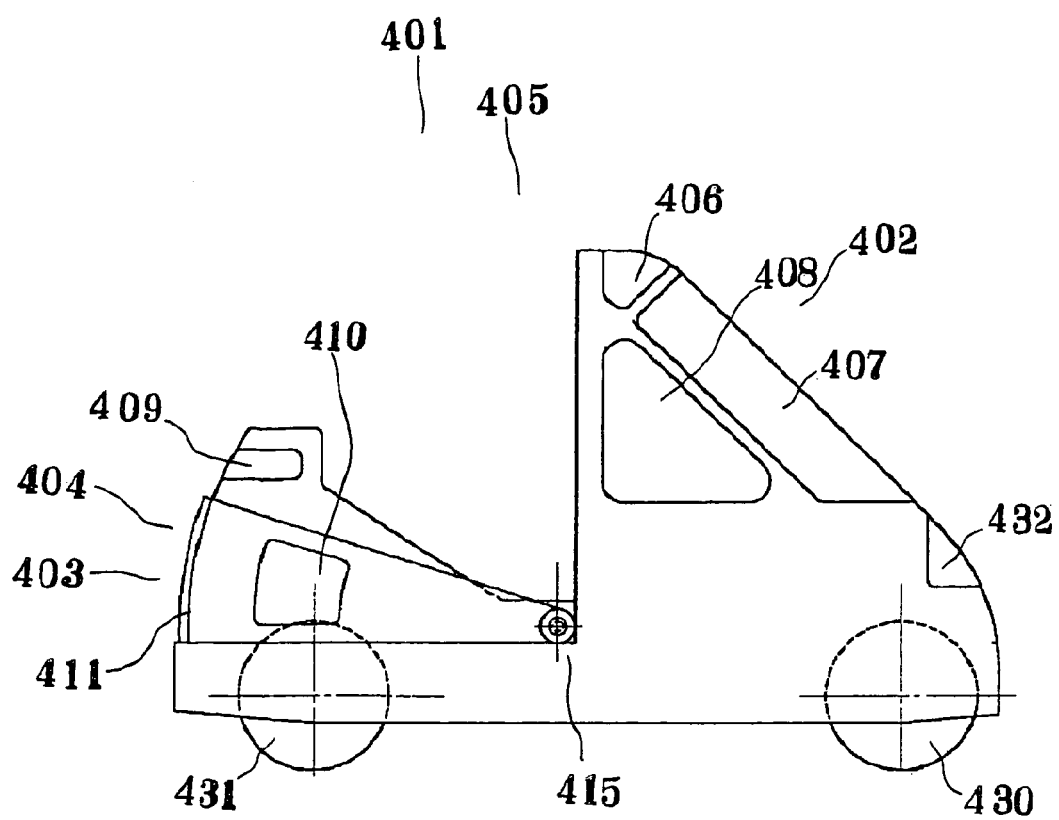
FIG. 23 is a diagram schematically illustrating a manner in which the seventh embodiment operates.
Figure 24:
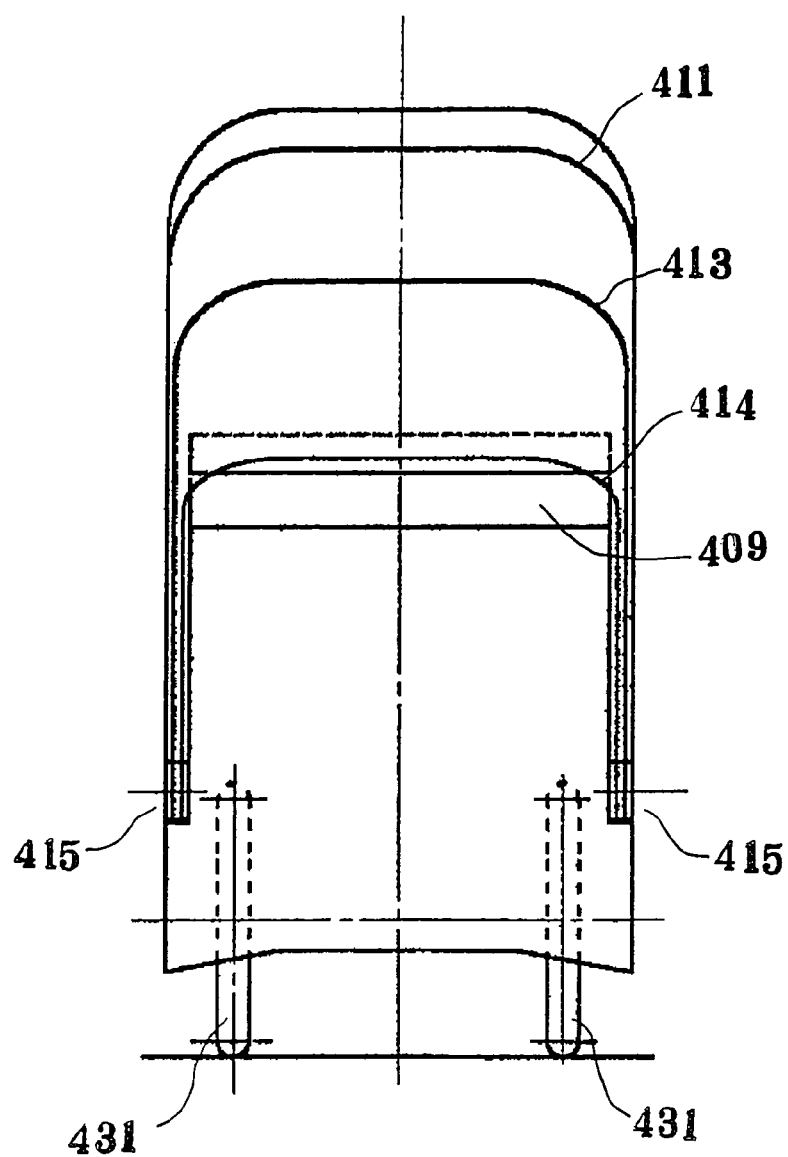
FIG. 24 is a simplified front view showing important parts of the seventh embodiment.

The man-driven vehicle 401 equipped with the cover structure according to this embodiment comprises, as shown by FIG. 22 or 23, a three- or four-wheel vehicle itself and a cover structure 405 substantially covering a whole of the vehicle itself. The cover structure 405 comprises a front part 402 of the cover structure provided with windows 406, 407, 408, a rear part 404 of the cover structure provided with a window 409 and a rotatable cover 403 lying between these front and rear parts and adapted to be funned out or fun-folded around a rotary shaft 415 for this cover.

According to this embodiment, the rotatable cover 403 comprises an upper rotatable cover section 411 having windows 410, an intermediate rotatable cover section 413 having windows 412 and adapted to overlap the inner side of the upper rotatable cover section 411 and a lower rotatable cover section 413 adapted to overlap the inner side of the intermediate rotatable cover section 414 so that the rotatable cover 403 is adapted to be fun-folded toward the rear part 404 of the cover structure around rotary shaft assembly 415.

Figure 25:
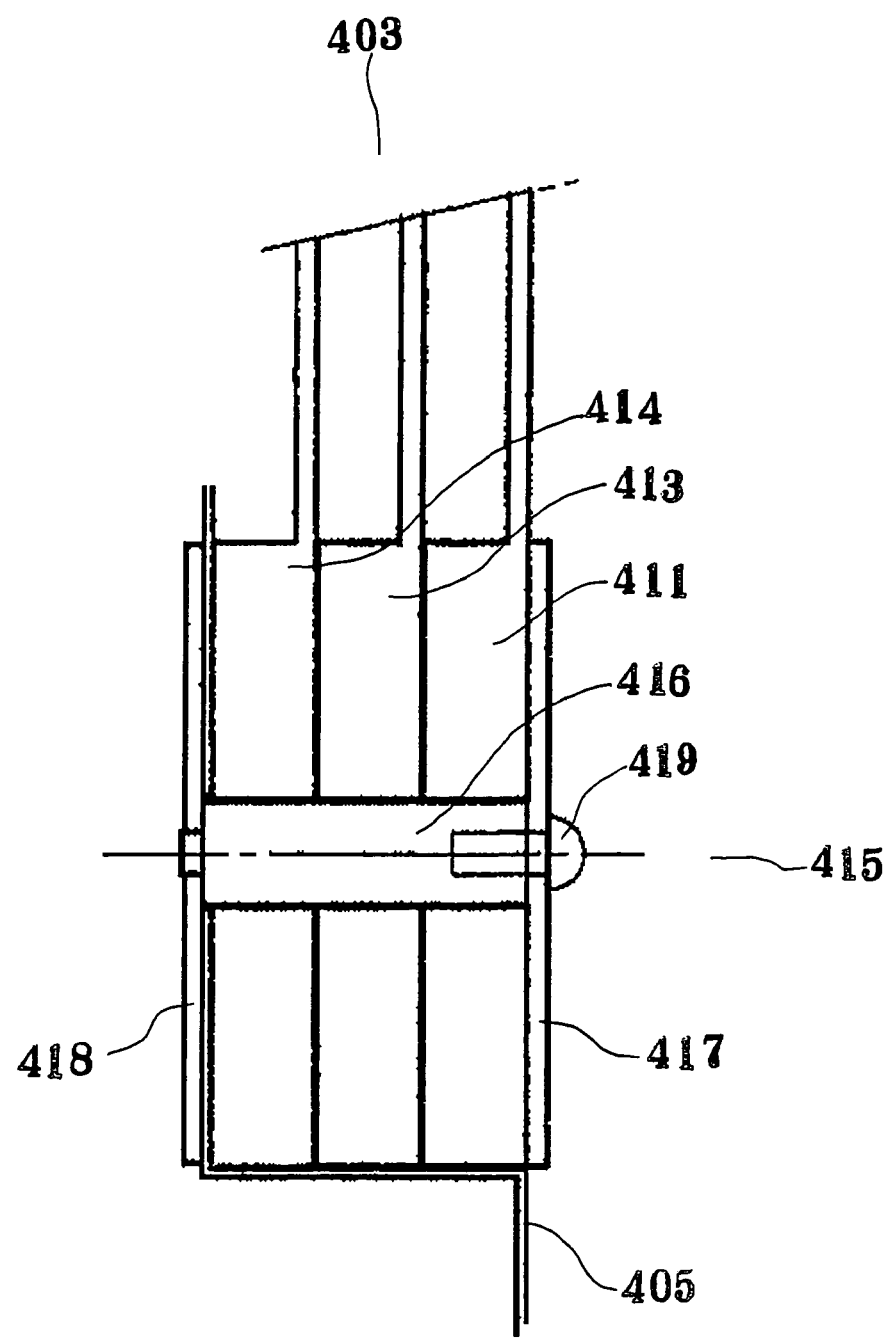
FIG. 25 is a scale-enlarged sectional view showing the important parts of the seventh embodiment.

As will be apparent from FIG. 25, the rotary shaft assembly 415 holds the rotatable cover 403 comprising the lower rotatable cover section 414, the intermediate rotatable cover section 413 and the upper rotatable cover section 411 contacting one another in this order from the inner side of the vehicle itself around a rotary shaft 416 between an inner press plate 418 and an outer press plate 471 and then fixed together by a set screw 419 so as be supported in a central region of the cover structure 405.

Figure 26:
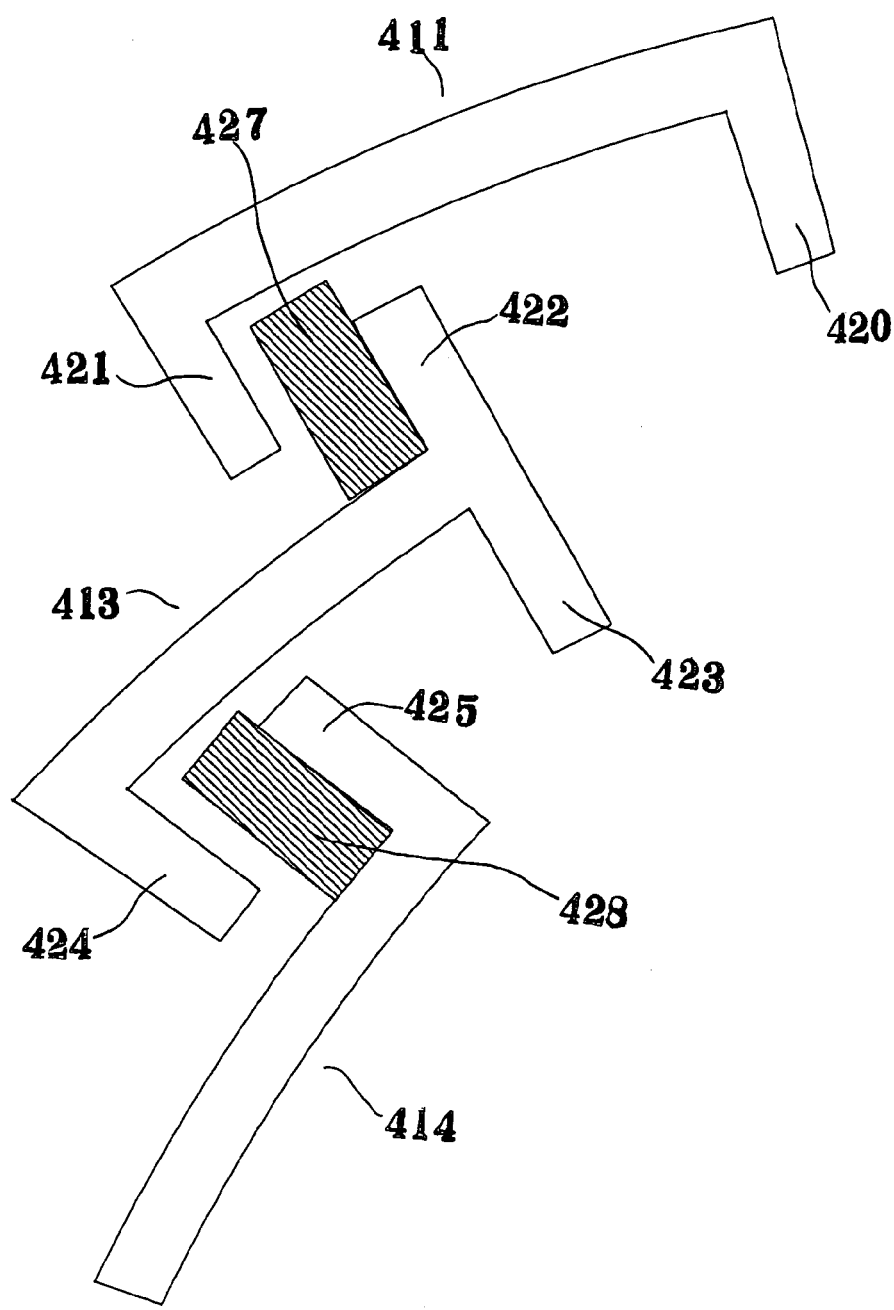
FIG. 26 is a diagram schematically illustrating the important parts of the seventh embodiment.

The upper rotatable cover section 411, the intermediate rotatable cover section 413 and the lower rotatable cover section 414 are provided, as best seen in FIG. 26, with interlocking means, respectively, operating to fun out or fun-fold the rotatable cover.

The interlocking means comprise interlocking projections 420, 421 extending downward from opposite ends of said upper rotatable cover section 411 as viewed in its opening and closing direction, an interlocking projection 422 extending upward from one end of said intermediate rotatable cover 413 section as viewed in its opening and closing direction, interlocking projections 423, 424 extending from the other end of said intermediate rotatable cover section 413 as viewed in its opening and closing direction and an interlocking projection 425 extending upward from one end of said lower rotatable cover section 414 as viewed in its opening and closing direction.

To fun-fold the rotatable cover 403, the upper rotatable cover section 411 stored in the space 426 defined on the rear part of the cover structure is held with the hand and rotated forward whereupon the interlocking projection 421 of this rotatable section comes in contact with the interlocking projection 422 of the intermediate rotatable cover section 413 so as to force the intermediate rotatable cover section 413 to be rotated forward. Thereupon, the interlocking projection 424 of the intermediate rotatable cover section 413 comes in contact with the interlocking projection 425 of the lower rotatable cover section 414 so as to force the lower rotatable cover section 414 to be rotated forward. In this way, the rotatable cover 403 is fun-folded with the upper rotatable cover section 411 being in contact integrally with the front part 402 of the cover structure.

As illustrated by FIG. 26, the interlocking projections 422, 425 extending upward from the intermediate rotatable cover section 413 and the lower rotatable cover section 414, respectively, are provided on inner sides thereof with packing members 427, 428 adapted to come in close contact with inner surfaces of the upper rotatable cover section 411 and the intermediate rotatable cover section 413, respectively. In this way, the rotatable cover 403 is reliably locked in its fun-folded position.

To fun out the rotatable cover 403, the upper rotatable cover section 411 is held with the hand and rotated rearward whereupon the interlocking projection 420 comes in contact with the interlocking projection 422 so as to force the intermediate rotatable cover section 413 to be funned out and then the interlocking projection 423 comes in contact with the interlocking projection 425 so as to force the lower rotatable cover section 414 to be funned out.

In the course of such operation for fun-folding or funning out, a frictional force generated between each pair of the overlapping cover sections or a contact resistance of the packing members 427, 428 allows the rotatable cover to be fixed at a desired position.

Reference numeral 430 designates a front wheel of the vehicle itself, reference numeral 431 designates a pair of rear wheels and reference numeral 432 designates a head light.

Referring now to FIGS. 27 through 33, an embodiment of the man-driven vehicle equipped with the cover structure wherein the cover structure is provided along its bottom with a ground contacting skirt so that the driver can be protected from muddy water, sandblast, insects, wind, rain, snow, chill and warmth which otherwise would attach the driver from below his or her feet.

According to this embodiment, a cover structure 502 substantially covering a whole of a vehicle itself 501 is fixed to a frame 510 of the vehicle 501 and the cover structure 502 is provided with a door 506 through which the driver may get on or off the vehicle 501.

In this embodiment, the flexible ground contacting skirt 530 provided along the bottom of the cover structure protects the driver from muddy water, sandblast, insects, rain, wind, snow, chill and warmth which otherwise would enter the cover structure from below the driver's feet. The ground contacting skirt 530 is sufficient flexible to ensure the vehicle running without any problem even when the skirt contacts the ground.

The ground contacting skirt 530 extends along the entire bottom of the cover structure and reliably protects the driver against muddy water, sandblast, insects, rain, wind, snow, chill and warmth which otherwise would attach the driver's feet from every direction.

The ground contacting skirt 530 comprises comprises a plurality of bottom sections 531 splitted one from another so that, even when the ground contacting skirt 530 comes in contact with any obstacle during running, these bottom sections 531 are sufficiently flexible and the vehicle can pass such obstacle and continue to run without any problem.

Figure 32:
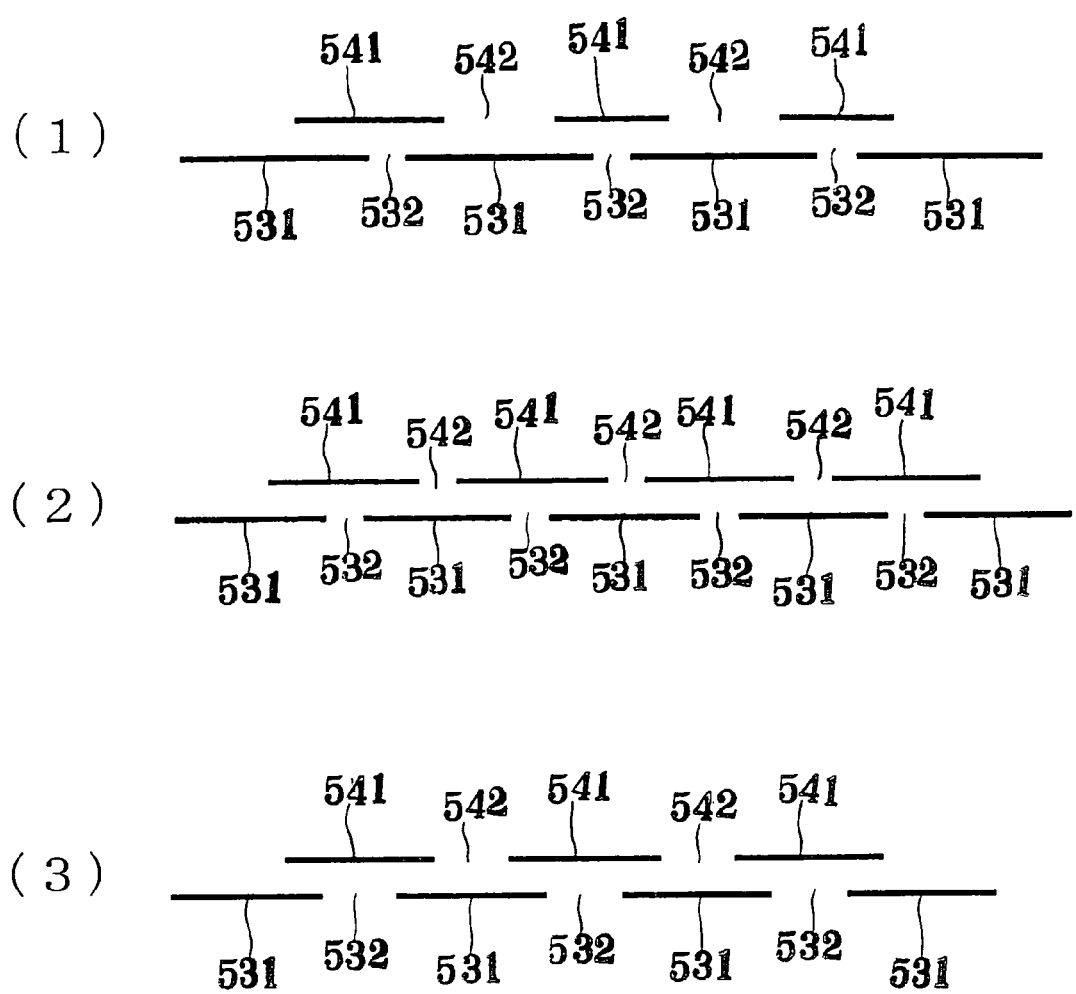
FIG. 32 is a simplified sectional diagram illustrating important parts of the eighth embodiment.

Based on this embodiment, the ground contacting skirt 530 can be arranged as illustrated by FIG. 32(1), in which another set of bottom sections 541 is placed on the set of bottom section 531 so that each of the bottom sections 541 may cover a split 532 between each pair of the adjacent bottom sections 531. In this way, it is possible to protect the driver from muddy water, sandblast, insects, wind, rain, snow, chill and warmth which otherwise would enter the vehicle through the splits 532 and attach the driver.

It is also possible, as illustrated by FIG. 32(2) or (3), to arrange two sets of bottom sections 531, 541 so that these two sets of bottom sections 531, 541 overlap one another and mutually cover the splits 532, 542 of these two sets of bottom sections.

Figure 33:
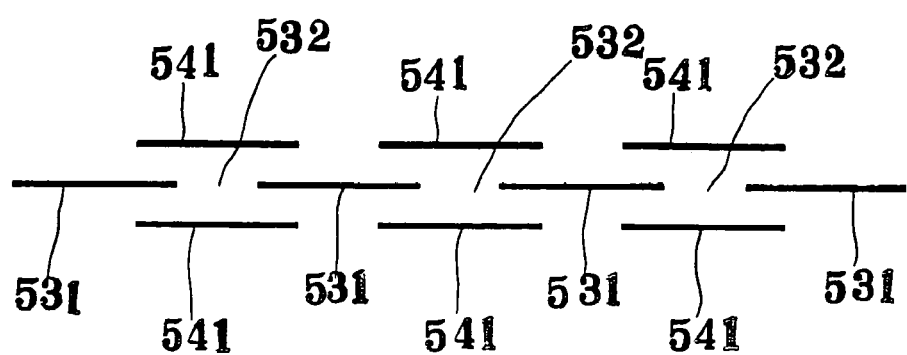
FIG. 33 is a simplified sectional diagram illustrating the important parts of the eighth embodiment.

An arrangement as illustrated by FIG. 33 is also possible, in which there are provided two sets of bottom sections 541 with the set of bottom sections 531 therebetween and doubly cover the splits 532 of the set of bottom sections 531.

In the case of this embodiment, a part or a whole of the ground contacting skirt 530 may be detachably attached to the bottom of the cover structure 502 in the conventional manner so that, if desired for example in fine weather, the skirt 530 can be removed.

Alternatively, the bottom sections 531 may be detachably attached one by one to the bottom of the cover structure 502 in the conventional manner so that a damaged bottom section can be exchanged with a new bottom section.

The ground contacting skirt 530 may be formed by the bottom sections made of elastically deformable synthetic rubber sheet or synthetic resin sheet to ensure that, even if the bottom sections come in contact with any obstacle, the bottom sections may readily be elastically deformed and pass such obstacle. It is easy for the bottom sections made of such elastically deformable material to be detachably attached to the cover structure.

The ground contacting skirt 530 may be provided with at least one split lying at its rear portion as viewed in the running direction of the vehicle itself 501 instead of providing the splits fully along the bottom of the cover structure 502 so that the skirt splits off as the skirt contacts any obstacle and this obstacle enters the inner side of the ground contacting skirt, the skirt splits off along its split lying at its rear portion as viewed in the vehicle's running direction so that the vehicle can pass such obstacle and avoid any accident such as upset due to sudden braking.

In the case of this embodiment, the cover structure 502 comprises a framed work made of transparent, translucent or opaque synthetic resin sheet or the like. If the structure 502 is made of relatively flexible synthetic resin sheet or the like, the cover structure 502 is reinforced by frame members (not shown) and integrally fixed to a frame 10 of the vehicle itself 501 by means of fastener members 504, 505 integrally mounted on the framework or frame members 510 of the vehicle itself 501.

In the case of the cover structure 502 made of reinforced plastics or the like, the cover structure 502 holds its shape without aid of any reinforcing means and may be directly fixed to the vehicle itself 501. Compared thereto, if the cover structure 502 is made of flexible synthetic resin sheet or the like, the cover structure 502 may hold its shape with aid of the frame members and integrally fixed to the frame 510 of the vehicle itself 501 by means of the fastener members 504, 505 integrally mounted on the framed work 510 of the vehicle itself 501

Even when the cover structure 502 is transparent, the cover structure may be provided with UV shielding property by coating treatment or the like to protect human body from harmful UV.

Figure 27:
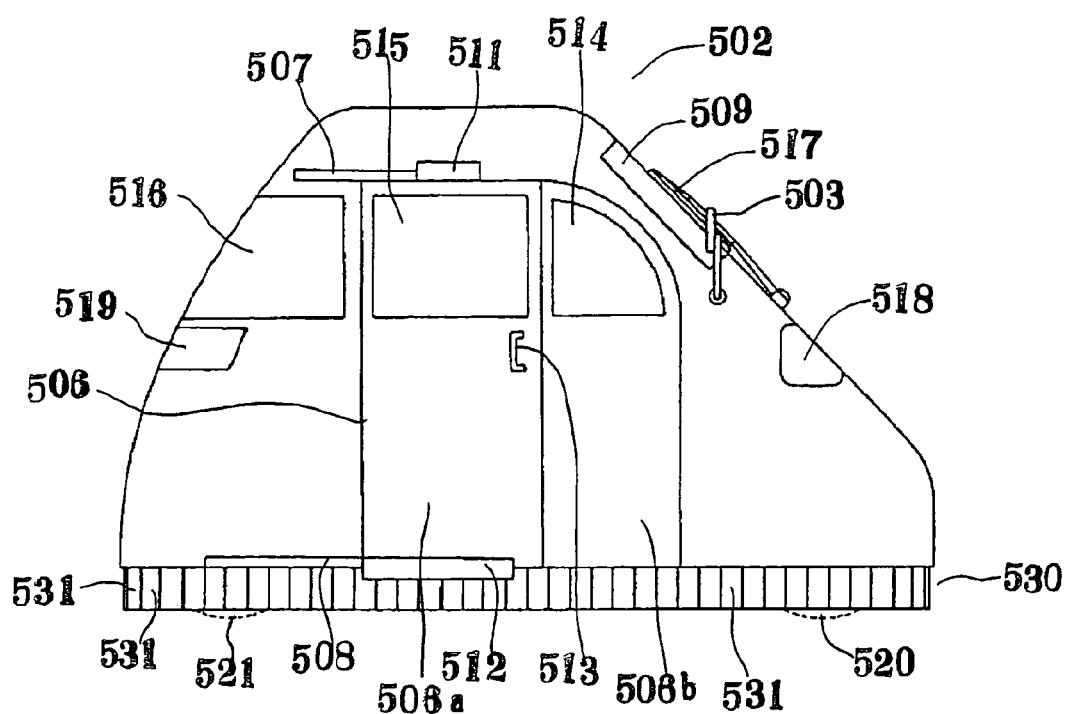
FIG. 27 is a simplified side view showing an eighth embodiment.
Figure 28:
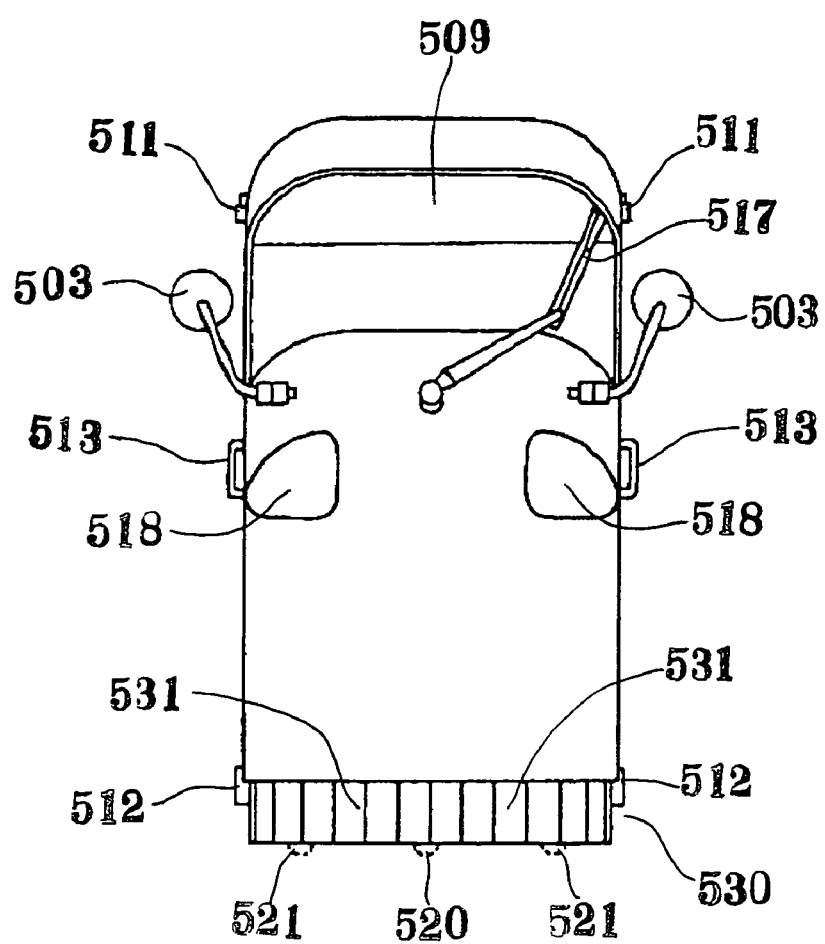
FIG. 28 is a simplified front view showing the eighth embodiment.
Figure 29:
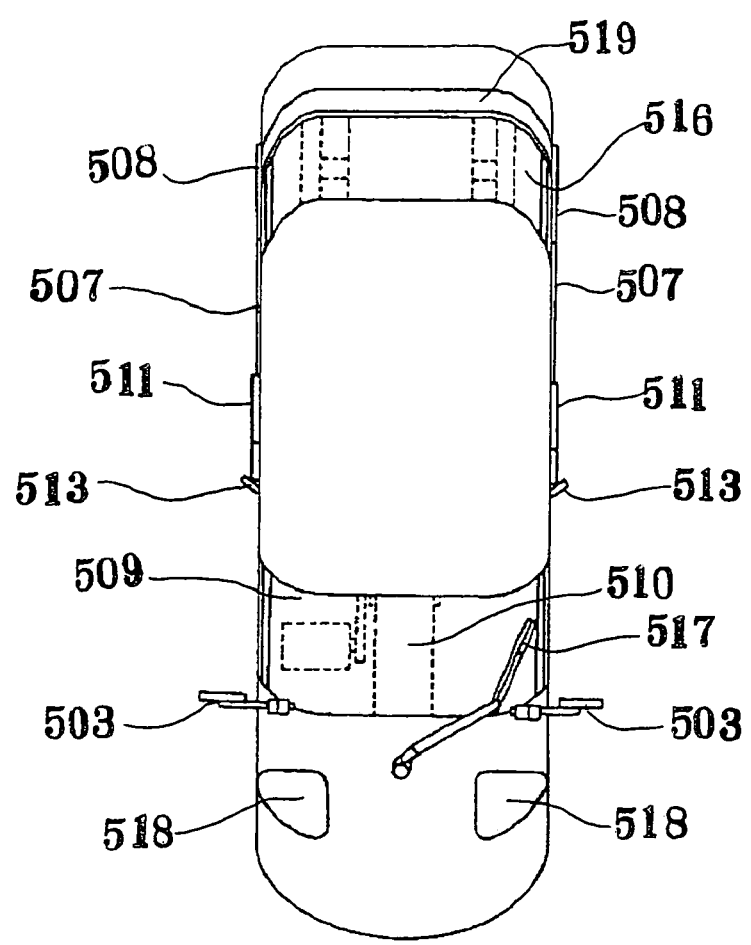
FIG. 29 is a simplified plan view showing the eighth embodiment.
Figure 30:
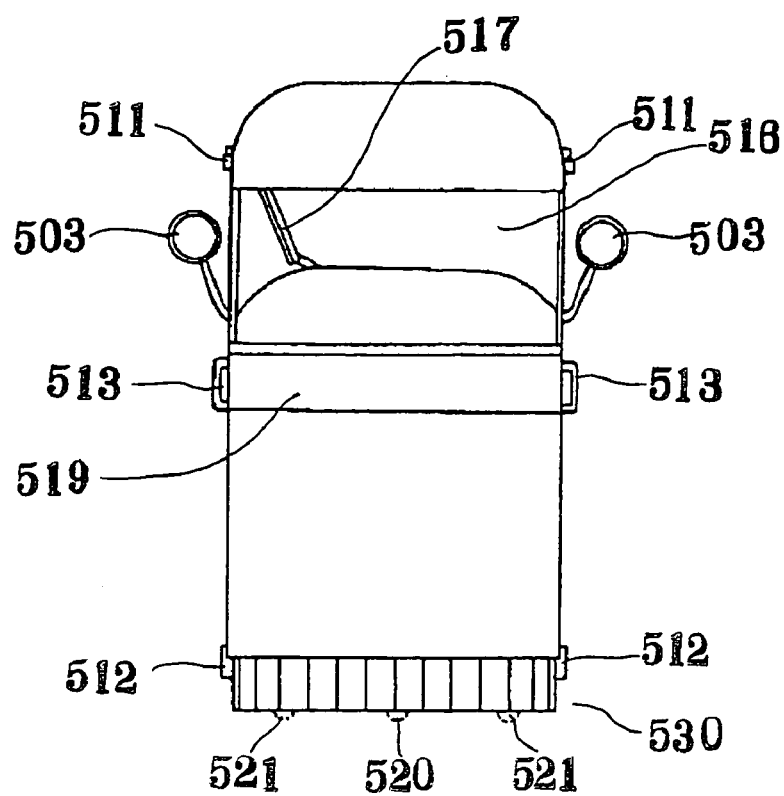
FIG. 30 is a simplified rear view showing the eighth embodiment.
Figure 31:
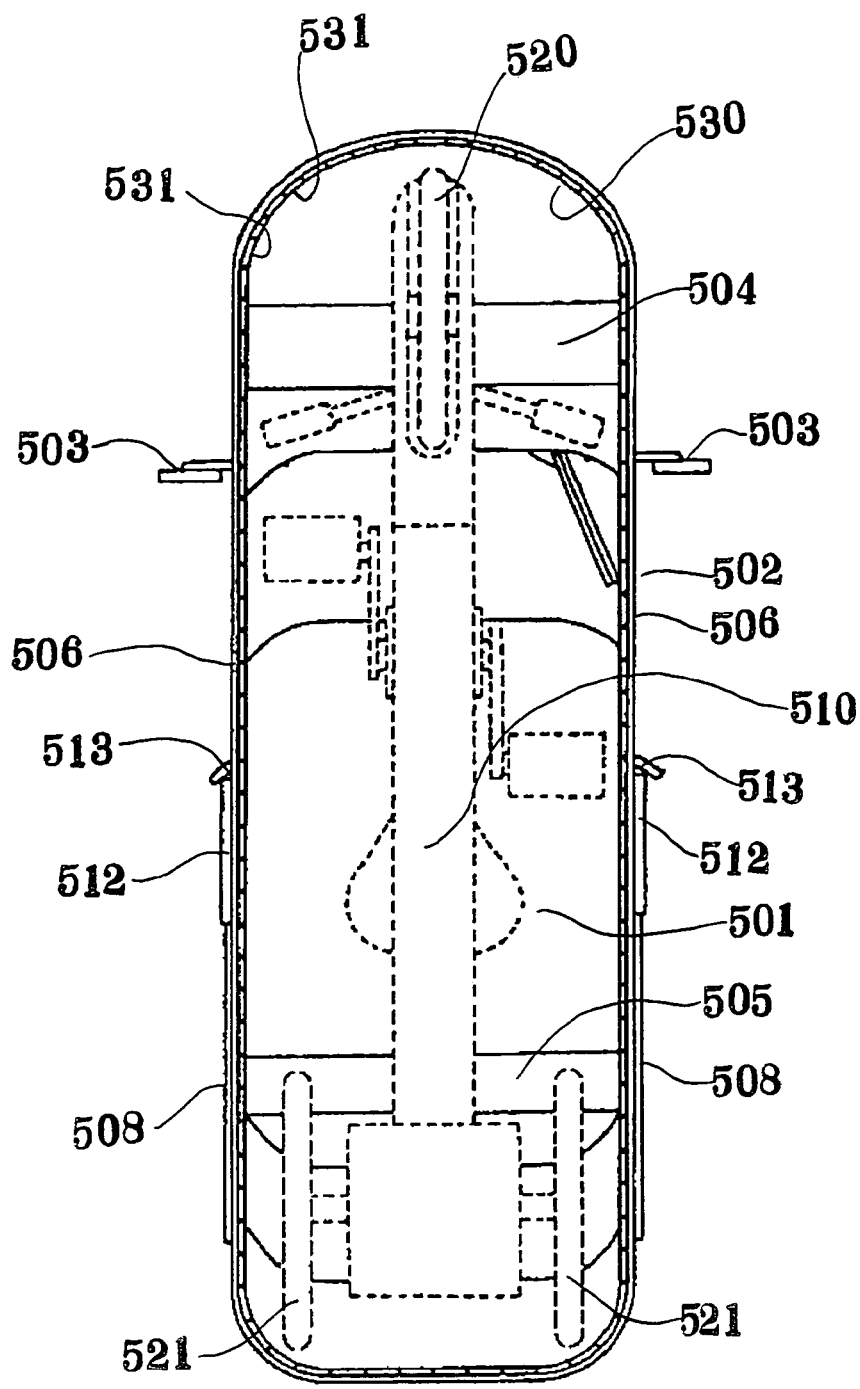
FIG. 31 is a simplified bottom view showing the eighth embodiment.

In the embodiment illustrated by FIGS. 27 through 31, the door 506 comprises a slide door 506a and a hinged door 506b. Referring to FIG. 27, the slide door 506a is provided with hinge members by means of which the slide door 506a is connected to the hinged door 506b. The slide door 506a is provided on its top and bottom with guide roller members 511, 512 by means of which the slide door 506a slides rearward along slide members 507, 508 to be opened whereupon the hinged door 506b is opened. In this way, the opening width of the door way can be enlarged with a relatively restricted range of sliding.

In this manner, combination of the slide door 506a with the hinged door 506b advantageously limits the range of sliding extension of the door 506 in comparison with the case in which the door comprises the slide door alone. Consequently, it can be avoided that the slide members 507, 508 might excessively extend rearward. In addition, it can be ensured that a lateral extension of the hinged door 506b from the cover structure 501 is appropriately short as the hinged door 6b is opened. Thus the door 506 can be opened even in a restricted space. Reference numeral 513 designates a doorknob and a similar doorknob may be provided also on the inner side of the door.

Referring to FIGS. 27 through 31, the door 506 is provided with a pair of windows 514, 515 wherein the window 515, 514 associated with the slide door 506a and the hinged door 506b may be opened and closed in slide mode.

The door of hinge-slide combination type may be realized also by a pair of doors hinge-connected to each other so that the one door section is pivotally mounted on one side of the door way to be opened or closed and the other door section is opened or closed with its free end sliding along upper or lower end of the door way. In this case, the door is preferably constructed so as to be folded inward of the cover structure 502 and not to project outward of the cover structure 502 when the door is opened or closed.

Alternatively, it is possible in this embodiment to obtain the desired hinge function without separately providing any hinge members. Specifically, a region in the cover structure 502 to be folded may be provided with sufficient flexibility to be easily folded as with aid of the hinge members.

It is also possible in the above-described embodiment to provide a locking member such as magnet, hook-and-loop fastener or the other fastener between the door 506 and the door way of the cover structure 502 so that the door 506 can be releasably locked to the cover structure 502 at the opened or closed position of the door 506. The driver 503 can selectively lock or unlock the door 506 to get on or off the vehicle and can drive with the door 506 held open, if desired to take in fresh and cool wind, for example, in heat weather of summer.

Alternatively, the door 506 as a whole may be attached to the door way of the cover structure 502 by releasable locking member such as the magnet, the hook-and-loop fastener or the other fastener so that the driver 503 can completely detach or attach from and to the cover structure 502 to get on or off the vehicle and, if desired, to remove the door 506.

It is possible to provide the doors 506 on lateral sides of the cover structure 502 so that these doors 506 may be opened or closed in slide mode.

In this case, the door 506 is adapted to be opened or closed in slide mode in longitudinal direction of the vehicle and thereby to ensure that the driver 503 can get on or off the vehicle through the door way even if there is no adequate free space on both sides of the vehicle. In addition, the door 506 does not project laterally and, in consequence, a relatively large door way is ensured.

In the case of the embodiment shown by FIGS. 27 through 31, the front of the cover structure 502 is provided with a front window 509, which is, in turn, provided with a wiper 517, and with head lights 518 used in night so as to be visible from the sides also. The cover structure 502 is provided on its rear side with a rear window 516 and a sufficiently wide tail light 519 to be visible from the sides also. The rail light 591 lies below the rear window 516 and has a reflecting function. The tail light 25 can be used also as a brake lamp.

The vehicle itself 501 can be equipped with the cover structure 502 no matter whether the vehicle is two-wheeled, three-wheeled or four-wheeled vehicle so far as the vehicle itself 1 has an appropriate framework. However, the vehicle itself 501 has preferably three or more wheels in order to avoid an apprehension that cross wind against the cover structure 502 might upset the vehicle itself 501.

Referring now to FIGS. 34 through 38, an embodiment of the man-driven vehicle equipped with the cover structure according to the present invention will be described, in which the cover structure is provided on its bottom with a floor panel serving to protect the driver from muddy water, sandblast, insects, wind, rain, snow, chill and warmth which otherwise would attach the driver from below his or her feet.

Figure 34:
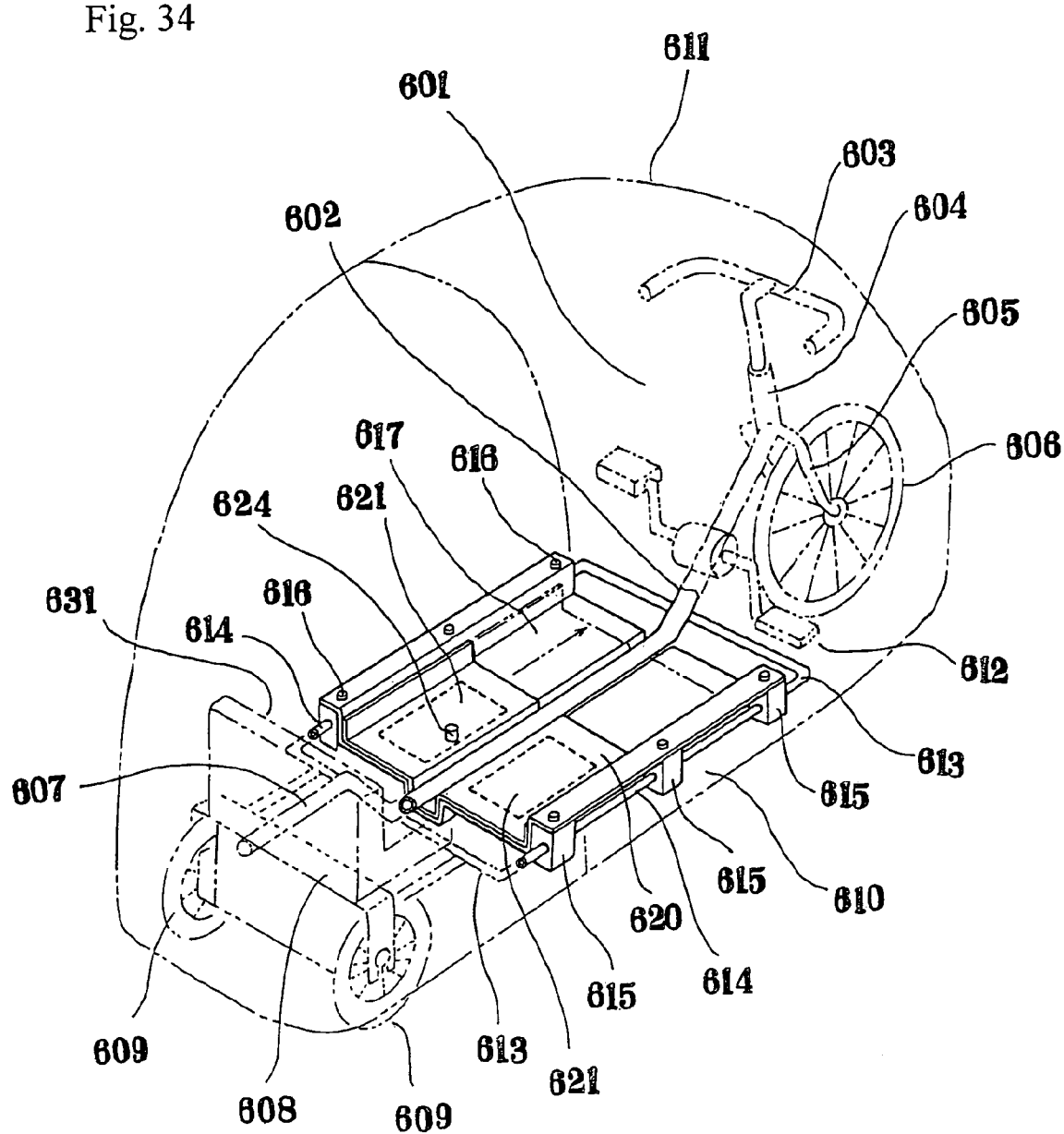
FIG. 34 is a simplified perspective view showing a ninth embodiment.

Referring to FIG. 34, reference numeral 601 designates a vehicle body comprising a center chassis 602 in form of thick pipe. The center chassis 602 is provided at its front end with a handle bearing 604 adapted for integrally and rotatably supporting a handle 603, a front fork 605 and a front wheel 606 and at its rear part 607 with a pair of rear wheels 609 supported via a bifurcated rear fork 608. A seat lies above the rear part 607 of the center chassis 602.

Reference numeral 611 designates a cover structure adapted for substantially complete covering of the vehicle and the driver. Reference numeral 612 designates foot pedals functioning to drive a rotary shaft for the rear wheels 609 via a chain (not shown).

Figure 35:
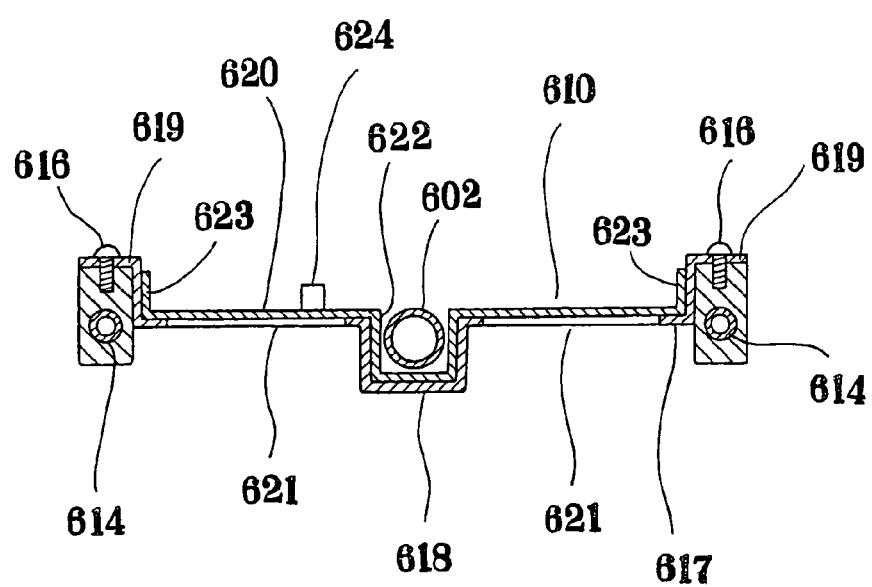
FIG. 35 is a sectional view of the important parts as taken along a line transversely extending in the longitudinal middle of the vehicle according to the ninth embodiment.

Front and rear bottom chassis 613 and right and left bottom chassis 614 integral with each other are fixed to the center chassis 602 to mount a floor panel 610. The right and left bottom chassis 614 are integrally provided with fixing brackets 615 on which a stationary floor panel 617 by set screws 616. As illustrated by FIG. 35, the stationary floor panel 617 is formed along its longitudinal center line with a crook 618 and includes right and left stationary frame members 619.

The cover structure 611 is integrally mounted on the bottom chassis 613, 614.

The stationary floor panel 617 is provided with openings 621 for feet setting on the ground and these openings 621 are openably covered with openable and closable floor panel section 620.

Figure 36:
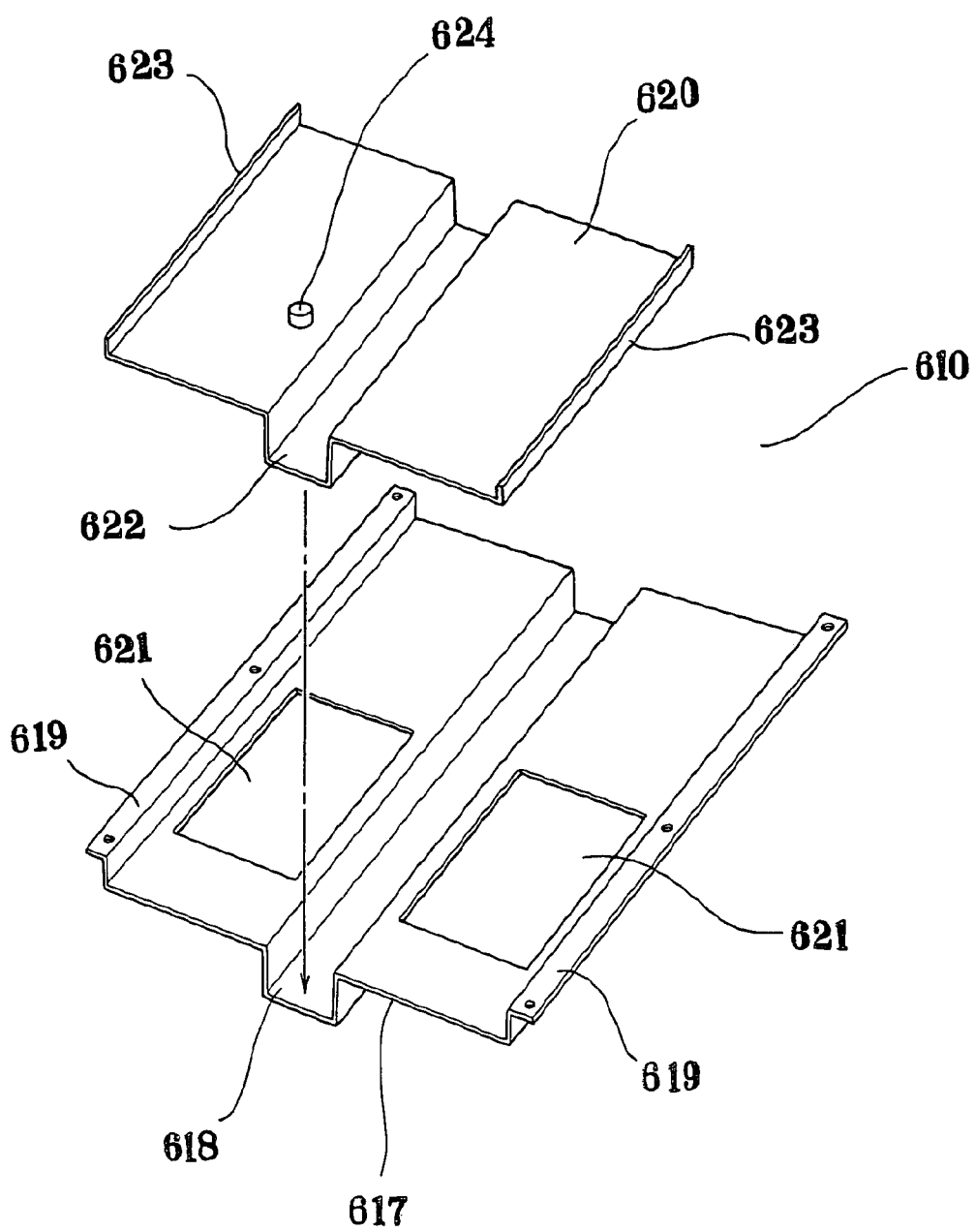
FIG. 36 is a simplified exploded view showing the important parts of the ninth embodiment.

In the embodiment illustrated by FIGS. 34 through 36, the openable and closable floor panel section 620 has a recess 622 extending along and being engaged with the crook 618 of the center chassis 602 and rising frames 623 lying on both sides of the recess 622 and brought in contact with the respective stationary frames 619. As has been described with reference to FIG. 1, the floor panel section 620 slides in a direction indicated by an arrow to uncover the openings 621 so that the driver may set his or her feet on the ground through these openings 621 without standing up from the seat to control the vehicle so as to be stopped or moved. The floor panel section 620 may be slid in the direction opposite to the arrow to cover the openings 621 again and thereby to block muddy water, wind or rain. Reference numeral 624 designates a projection used to operate the floor panel section 620.

Figure 37:
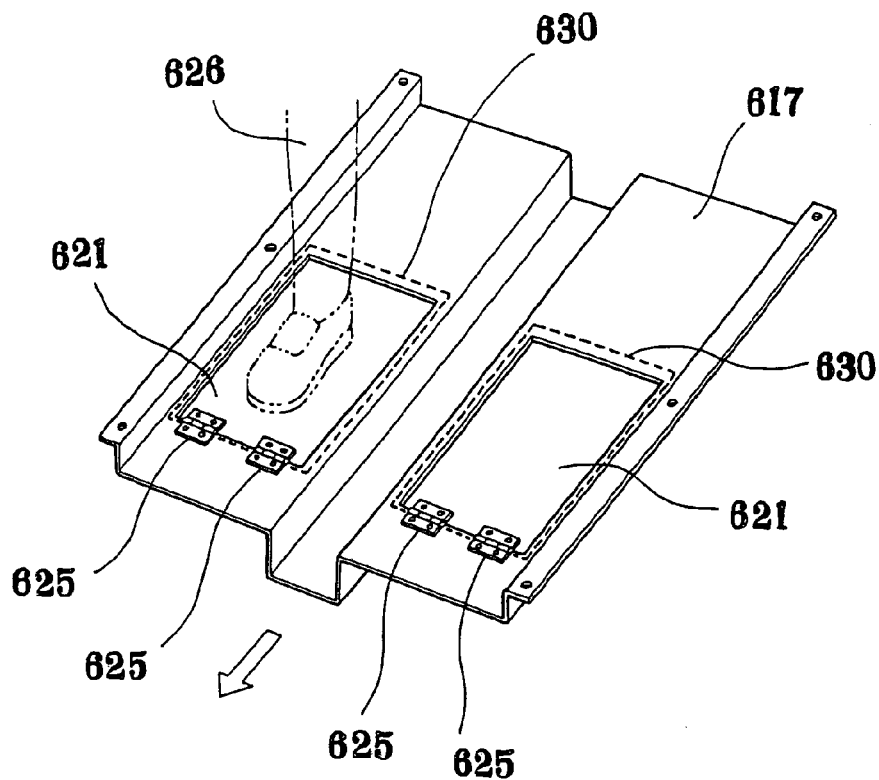
FIG. 37 is a diagram schematically illustrating a manner in which important parts of a tenth embodiment operate.
Figure 38:
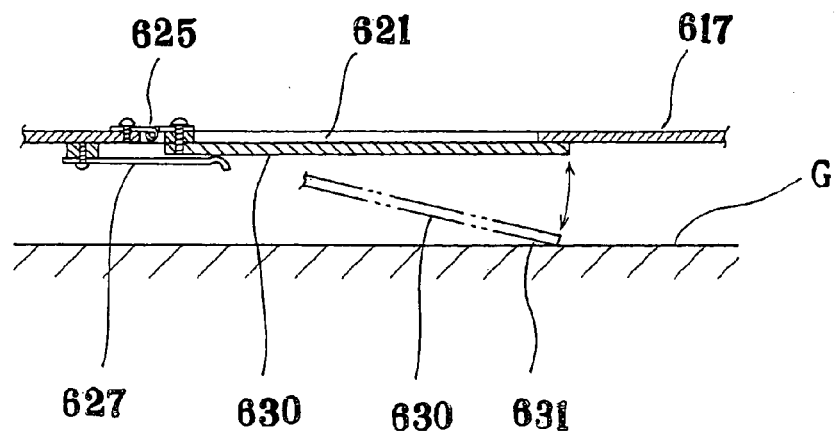
FIG. 38 is a diagram schematically illustrating another manner in which the important parts of the tenth embodiment operate.

Finally, in the case of an embodiment illustrated by FIGS. 37 and 38, the openings 621 of the stationary floor panel 617 for feet setting on the ground are covered from below with an openable and closable floor panel section 630. When the driver puts his or her feet 626 on this floor panel section 630, as illustrated by FIG. 37, the floor panel section 630 rotates around hinges 625 as indicated dashed lines in FIG. 37 until an end 631 of the floor panel section 630 opposite to the hinges 625 comes in contact with the ground G so as to brake and to stop the vehicle. The vehicle runs in the direction of the arrow, i.e., leftward as viewed in FIG. 38.

The hinges 625 are laded on lower sides thereof with leaf springs 627 and the floor panel section 630 is normally closed. When the driver tramples down the floor panel section 630 against the force of these leaf springs 627, the openings 621 are uncovered, and when the driver puts his or her feet off from the floor panel section 630, the openings 621 are covered again.

Size, number and location of the opening 621 are not limited to those as have been described above and may be appropriately selected. It is possible to provide the openable and closable floor panel sections associated with the respective openings 621. It is also possible to interlock the floor panel section 630 with the pair of openings 621 for feet setting on the ground so that the pair of openings 621 may be uncovered at once as the floor panel section 630 is trampled down.

What is claimed is:

1. A man-driven vehicle comprising:
   a cover structure adapted to substantially cover the vehicle, including a front wheel and back wheels, said cover structure having a selectively openable and closable structure adapted for at least one person to get on and off the vehicle;
   a handlebar;
   a vehicle frame; and
   pedals, wherein
      said man-driven vehicle is a foot-powered tricycle,
      said cover structure substantially covers a front and sides of the front wheel and a rear and sides of the back wheels, the frame, the pedals, and the handlebar,
      said cover structure includes a lower edge which is below respective axles of said front and rear wheels and extends in a lengthwise direction of the vehicle beyond the wheels,
      said openable and closable structure comprises a door on a side surface of said cover structure, a lower edge of said door being proximate to said lower edge of said cover,
      said door is a combination of a door section adapted to be opened and closed in slide mode and a door section adapted to be opened and closed in hinge mode, and said door section adapted to be opened and closed in hinge mode is connected to said door section adapted to be opened and closed in slide mode by means of hinge members.

2. A man-driven vehicle comprising:
   a cover structure adapted to substantially cover the vehicle, including a front wheel and back wheels, said cover structure having a selectively openable and closable structure adapted for at least one person to get on and off the vehicle;
   a handlebar;
   a vehicle frame; and
   pedals, wherein
      said man-driven vehicle is a foot-powered tricycle,
      said cover structure substantially covers a front and sides of the front wheel and a rear and sides of the back wheels, the frame, the pedals, and the handlebar,
      said cover structure includes a lower edge which is below respective axles of said front and rear wheels and extends in a lengthwise direction of the vehicle beyond the wheels,
      said openable and closable structure comprises a door on a side surface of said cover structure, a lower edge of said door being proximate to said lower edge of said cover,
      said door is a combination of a door section adapted to be opened and closed in slide mode and a door section adapted to be opened and closed in hinge mode, and
      said door section adapted to be opened and closed in slide mode is connected to said door section adapted to opened and closed in hinge mode so that the door may be folded.

3. The man-driven vehicle according to claim 1 or 2, further comprising a second door on another side surface of said cover structure.

4. The man-driven vehicle according to claim 1, wherein said door section adapted to be opened and closed in slide mode is connected to guide roller members of the cover structure by means of hinge members so that the door may be retracted within the cover structure.

5. The man-driven vehicle according to claim 1 or 2, wherein said door is detachably provided.

6. The man-driven vehicle according to claim 1 or 2, wherein the cover structure is provided along a bottom with a ground contacting skirt.

7. The man-driven vehicle according to claim 6, wherein said ground contacting skirt extends along an entire outer perimeter of the bottom of the cover structure.

8. The man-driven vehicle according to claim 6, wherein said ground contacting skirt comprises at least one split so that the skirt splits along said split as the skirt contacts an obstacle.

9. The man-driven vehicle according to claim 8, wherein said ground contacting skirt comprises a first set of bottom sections separated by splits, said bottom sections being adapted to separate one from another along said splits.

10. The man-driven vehicle according to claim 9, wherein said ground contacting skirt comprises a second set of bottom sections so as to cover the splits of the first set of bottom sections.

11. The man-driven vehicle according to claim 10, wherein said first and second sets of bottom sections mutually overlap one another.

12. The man-driven vehicle according to claim 9, wherein said first and second sets of bottom sections are detachably mounted, section by section, on the bottom of the cover structure.

13. The man-driven vehicle according to claim 6, wherein said ground contacting skirt is detachably mounted on the bottom of the cover structure.

14. The man-driven vehicle according to claim 6, wherein said ground contacting skirt comprises an elastically deformable member made of synthetic rubber or synthetic resin.

15. The man-driven vehicle according to claim 1 or 2, further comprising a floor panel.

16. The man-driven vehicle according to claim 15, wherein the floor panel is provided with openings for feet so feet can thereby be set on the ground.

17. The man-driven vehicle according to claim 16, wherein the openings for feet are provided with an openable and closable floor panel section.

18. The man-driven vehicle according to claim 17, wherein the openable and closable floor panel section comprises a slidable floor panel section.

19. The man-driven vehicle according to claim 17, wherein the openable and closable floor panel section comprises a hinged floor panel section.

20. The man-driven vehicle according to claim 19, wherein the hinged floor panel section includes an edge adapted to be in contact with the ground as the hinged floor panel section is opened.

21. The man-driven vehicle according to claim 15, wherein the floor panel extends below the pedals.

22. The man-driven vehicle according to claim 15, wherein the cover structure is integrally provided with the floor panel and extends above the floor panel so as to substantially cover a driver.

23. The man-driven vehicle according to claim 1 or 2, wherein the cover structure is provided with a solar battery.

24. The man-driven vehicle according to claim 1 or 2, wherein the cover structure is provided with a front light.

25. The man-driven vehicle according to claim 1 or 2, further comprising a front window having a wiper.

26. The man-driven vehicle according to claim 1 or 2, further comprising a tail light on a rear side of said cover structure.

27. The man-driven vehicle according to claim 1 or 2, further comprising a battery adapted to be charged as the vehicle runs.

28. The man-driven vehicle according to claim 1 or 2, further comprising a stationary stand adapted for rotatably supporting the wheels which are rotated as the pedals are worked.

29. The man-driven vehicle according to claim 1 or 2, wherein the cover structure is provided with openable and closable windows thereby to allow repairing of the vehicle from outside of the vehicle.

* * * * *